US012671549B1

(12) United States Patent
Chen et al.

(10) Patent No.: US 12,671,549 B1
(45) Date of Patent: Jun. 30, 2026

(54) SYSTEMS AND METHODS FOR IMPROVING DEMODULATION REFERENCE SIGNAL CHANNEL ESTIMATION

(71) Applicant: Meta Platforms, Inc., Menlo Park, CA (US)

(72) Inventors: Weizhong Chen, Georgetown, TX (US); Ahmed Gamal Helmy Mohamed, San Jose, CA (US); Colby Scott Boyer, Austin, TX (US)

(73) Assignee: Meta Platforms, Inc., Menlo Park, CA (US)

( * ) Notice: Subject to any disclaimer, the term of this patent is extended or adjusted under 35 U.S.C. 154(b) by 533 days.

(21) Appl. No.: 18/301,906

(22) Filed: Apr. 17, 2023

Related U.S. Application Data

(60) Provisional application No. 63/331,484, filed on Apr. 15, 2022.

(51) Int. Cl.
H04L 5/00 (2006.01)
H04L 25/02 (2006.01)

(52) U.S. Cl.
CPC ........ H04L 5/0051 (2013.01); H04L 25/0204 (2013.01)

(58) Field of Classification Search
CPC . H04L 5/0051; H04L 25/0204; H04L 5/0051; H04L 5/0053; H04L 5/0026; H04L 5/0042; H04L 25/0226
See application file for complete search history.

(56) References Cited

U.S. PATENT DOCUMENTS 8,085,861 B2 12/2011 Yang et al.
10,541,838 B2 1/2020 Lee (Continued)

FOREIGN PATENT DOCUMENTS

BR 102014015835 B1 8/2021
CN 105075144 A * 11/2015 ............ H04W 72/23

(Continued)

OTHER PUBLICATIONS

Driggs J.D., "An Improved Channel Estimation Algorithm for Filter Bank Multicarrier Spread Spectrum," Master of Science Department of Electrical and Computer Engineering the University of Utah, Dec. 2017, 48 Pages.

(Continued)

*Primary Examiner* — Atique Ahmed
(74) *Attorney, Agent, or Firm* — EVERSHEDS SUTHERLAND (US) LLP

(57) ABSTRACT

A disclosed computer-implemented method may include receiving, as part of a demodulation reference signal (DMRS) channel estimation operation, a frequency domain channel estimation signal comprising a plurality of DMRS samples, generating an extended channel estimation signal by determining at least one extended DMRS sample that extends at least one edge of the channel estimation signal, and generating an augmented channel estimation signal by extrapolating, based on the extended channel estimation signal, a frequency edge for the augmented channel estimation signal. The method may also include designing, based on a measurement of a DMRS value included in the augmented channel estimation signal, a polyphase filter, and estimating a DMRS channel by filtering the augmented channel estimation signal using the designed polyphase filter. Various other systems and methods are also disclosed.

20 Claims, 24 Drawing Sheets

(56) References Cited

U.S. PATENT DOCUMENTS

| | | | |
|---|---|---|---|
| 10,630,441 B2 * | 4/2020 | Hessler | H04L 5/006 |
| 10,931,486 B2 | 2/2021 | Nazarathy et al. | |
| 10,999,117 B2 | 5/2021 | Pawar et al. | |
| 2015/0043474 A1 | 2/2015 | Takeda et al. | |
| 2016/0337105 A1 | 11/2016 | Lawton et al. | |
| 2018/0026764 A1 * | 1/2018 | Namgoong | H04B 7/0413 |
| | | | 370/329 |
| 2018/0092080 A1 * | 3/2018 | Kim | H04L 5/0053 |
| 2020/0287754 A1 * | 9/2020 | Stathakis | H04L 25/0226 |
| 2021/0160117 A1 * | 5/2021 | Xiong | H04L 27/2602 |
| 2022/0052880 A1 | 2/2022 | Hewavithana et al. | |
| 2022/0070037 A1 | 3/2022 | Nam et al. | |
| 2022/0200824 A1 * | 6/2022 | Sakhnini | H04L 5/0048 |
| 2023/0246679 A1 | 8/2023 | Patchava et al. | |
| 2023/0308233 A1 | 9/2023 | Guetta et al. | |
| 2025/0055637 A1 | 2/2025 | Ferdinand et al. | |

FOREIGN PATENT DOCUMENTS

| | | | | |
|---|---|---|---|---|
| CN | 107666452 A | * | 2/2018 | H04L 67/12 |
| CN | 108809609 B | | 7/2019 | |

OTHER PUBLICATIONS

Ijiga O.E., et al., "Review of Channel Estimation for Candidate Waveforms of Next Generation Networks," Electronics, 2019, vol. 8, No. 9, 50 Pages.

Irizarry A.V., "Polyphase Filter and Demodulation Techniques for Optimizing Signal Collection Processing," No. AFRL-IF-RS-TM-2003-3. Air Force Research Lab Rome NY Information, Feb. 2003, 44 Pages.

Qiang B., et al., "Uplink Reference Signal Design for GEO Dual-polarized MIMO Satellite LTE Communication System," 2014 IEEE/CIC International Conference on Communications in China (ICCC), Oct. 15, 2014, 5 Pages.

* cited by examiner

Method
500

$$C(n) = \frac{RR}{RR^*} B^*(n), \quad n = 1, 2, 3 \ldots, N_R$$

Where $\dfrac{RR}{RR^*}$ does not change with n

602

B(n)     R     C(n)

$n$        $n$ $n = 1, 2, 3, \ldots, N_R$

R -- Right Edge Sample

C -- A Point to be Extended

B -- Mirror Image of C

Right Extension
$N_R$ Samples

600

700

$$C(n) = \frac{LL}{LL^*} B^*(n), \; n = 1, 2, 3 \dots, N_L$$

Where $\dfrac{LL}{LL^*}$ does not Change with n

702

Left Extension
$N_L$ Samples $n = 1, 2, 3, \dots, N_L$

L -- Left Edge Sample
C -- A Point to be Extended
B -- Mirror Image of C

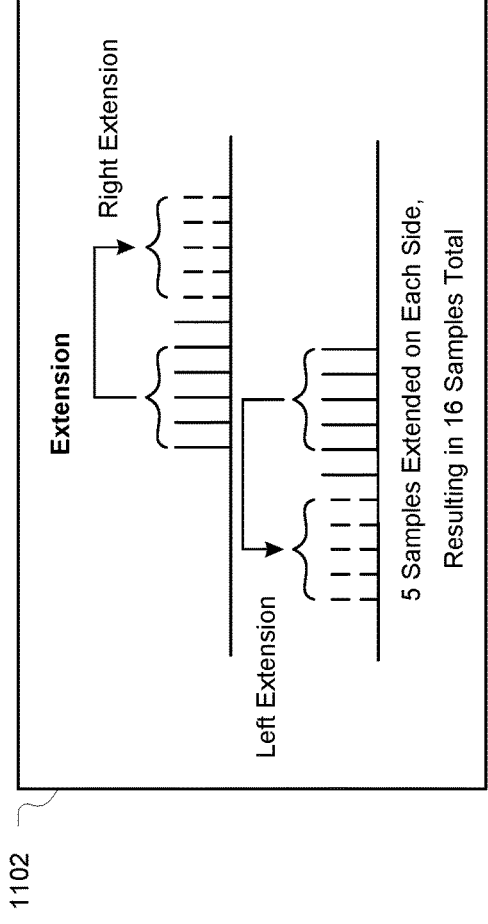
1102
Extension
Right Extension
Left Extension
5 Samples Extended on Each Side,
Resulting in 16 Samples Total
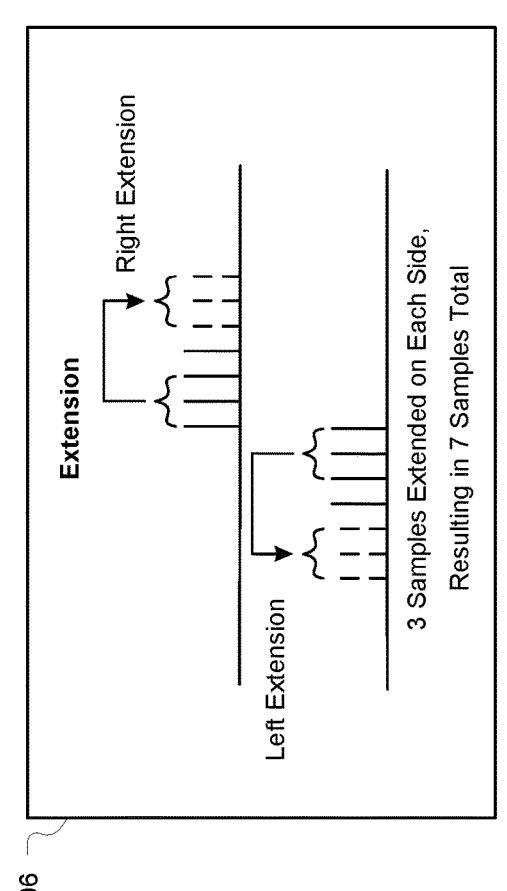
1106
Extension
Right Extension
Left Extension
3 Samples Extended on Each Side,
Resulting in 7 Samples Total
*FIG. 11*
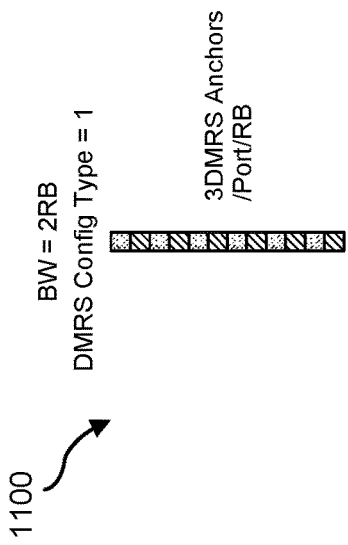
1100
BW = 2RB
DMRS Config Type = 1
3DMRS Anchors
/Port/RB
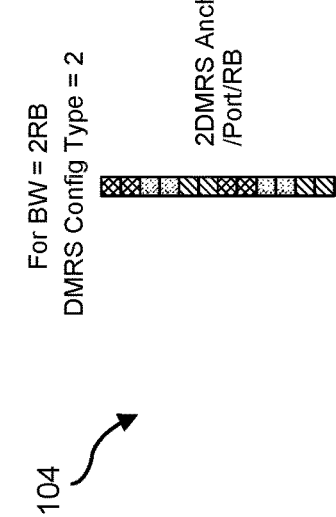
1104
For BW = 2RB
DMRS Config Type = 2
2DMRS Anchors
/Port/RB

1700

2000

For ports of CDM group1, with DMRS ConfigType=1

Let $H(k)$ be the LS channel estimate with edges extended and edges extrapolated Polyphase Filtering $Y_0(k), k = 0,1,..., 3Nrb - 1$ $Y_1(k), k = 0,1,..., 3Nrb - 1$ $Y_2(k), k = 0,1,..., 3Nrb - 1$ $Y_3(k), k = -1,0,1,..., 3Nrb\text{-}2$ Where Nrb is BW in RB Assembling the polyphase results into DMRS channel estimates $12 \times Nrb$ For ports of CDM group2, with DMRS ConfigType=1

Let $H(k)$ be the LS channel estimate with edges extended and edges extrapolated Polyphase Filtering $Y_0(k), k = 0,1, ..., 3Nrb - 1$ $Y_1(k), k = 0,1, ..., 3Nrb - 1$ $Y_2(k), k = -1, 0, 1, ..., 3Nrb - 2$ $Y_3(k), k = -1, 0, 1, ..., 3Nrb - 2$ Where Nrb is BW in RB Assembling the polyphase results into DMRS channel estimates 12xNrb

2200

For ports of CDM group1, with DMRS ConfigType=2

Let $H(k)$ be the LS channel estimate with edges extended and edges extrapolated

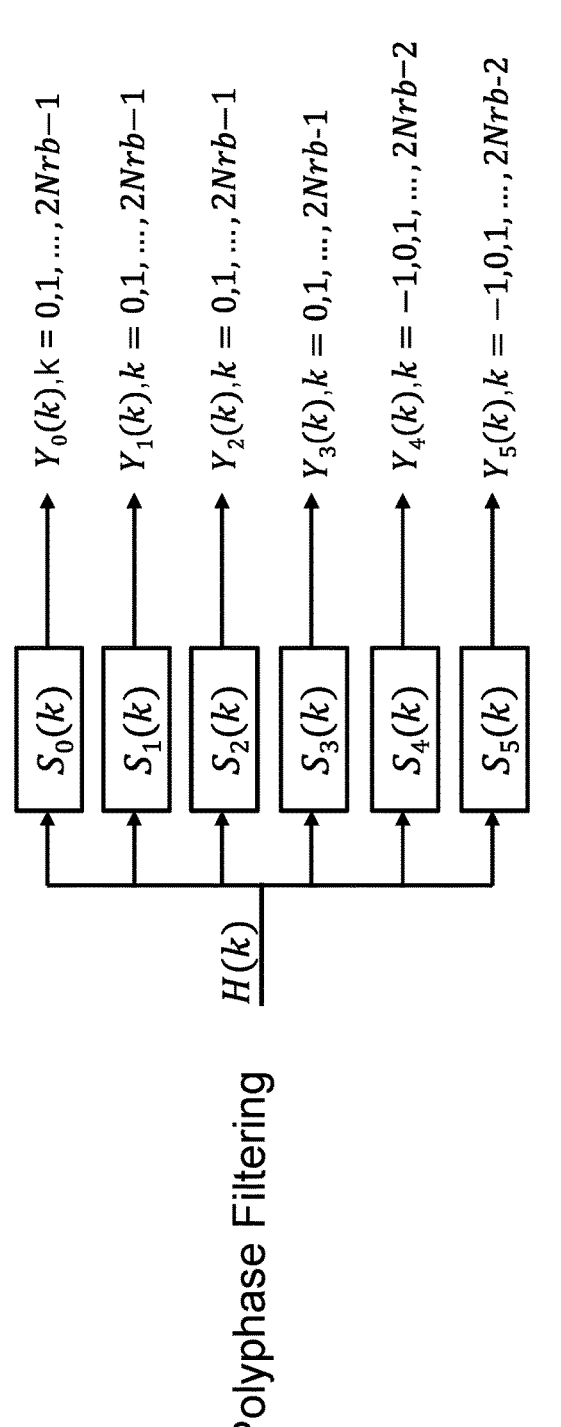

Polyphase Filtering $Y_0(k), k = 0,1,...,2Nrb-1$ $Y_1(k), k = 0,1,...,2Nrb-1$ $Y_2(k), k = 0,1,...,2Nrb-1$ $Y_3(k), k = 0,1,...,2Nrb-1$ $Y_4(k), k = -1,0,1,...,2Nrb-2$ $Y_5(k), k = -1,0,1,...,2Nrb-2$ Where Nrb is BW in RB Assembling the polyphase results into DMRS channel estimates

| $Y_5(-1)$ | $Y_6(-1)$ | $Y_0(0)$ | $Y_1(0)$ | $Y_2(0)$ | $Y_3(0)$ | $Y_4(0)$ | - - - - | $Y_4(2Nrb-2)$ | $Y_5(3Nrb-2)$ | $Y_0(2Nrb-1)$ | $Y_1(2Nrb-1)$ | $Y_2(2Nrb-1)$ | $Y_3(2Nrb-1)$ |

$12xNrb$

*FIG. 22*

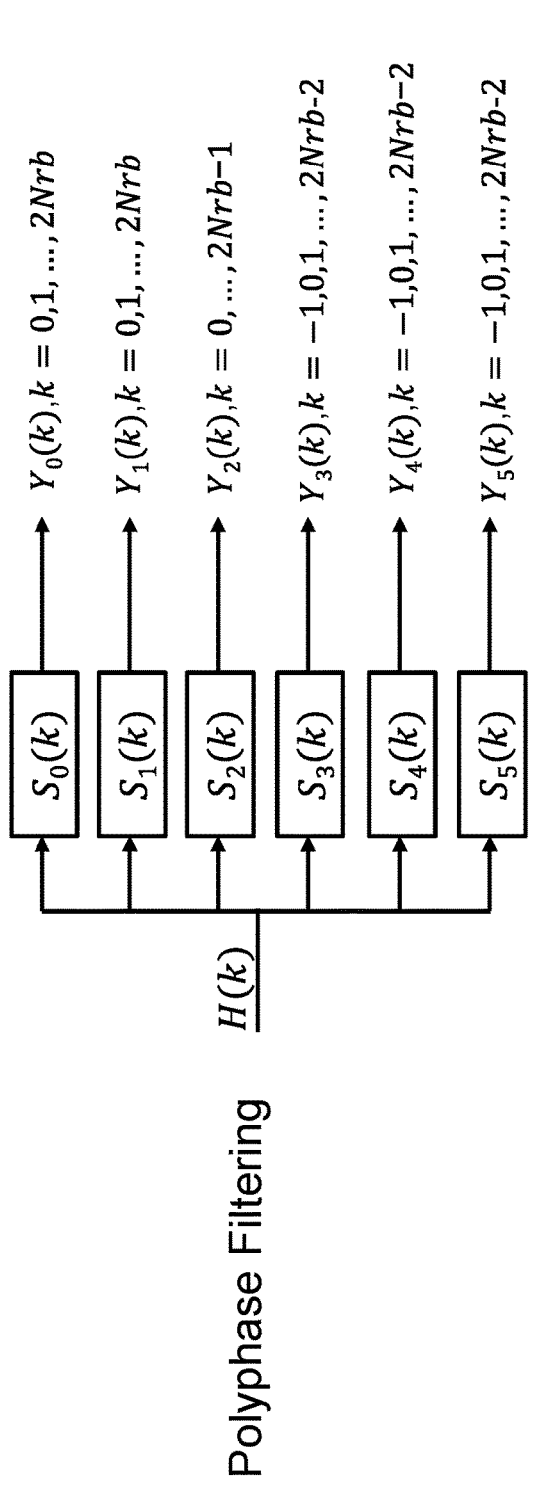

For ports of CDM group2, with DMRS ConfigType=2

Let $H(k)$ be the LS channel estimate with edges extended and edges extrapolated $Y_0(k), k = 0,1, \ldots, 2Nrb$ $Y_1(k), k = 0,1, \ldots, 2Nrb$ $Y_2(k), k = 0, \ldots, 2Nrb-1$ $Y_3(k), k = -1,0,1, \ldots, 2Nrb-2$ $Y_4(k), k = -1,0,1, \ldots, 2Nrb-2$ $Y_5(k), k = -1,0,1, \ldots, 2Nrb-2$ $S_0(k)$ $S_1(k)$ $S_2(k)$ $S_3(k)$ $S_4(k)$ $S_5(k)$ $H(k)$ Polyphase Filtering Assembling the polyphase results into DMRS channel estimates

| $Y_3(-1)$ | $Y_4(-1)$ | $Y_5(-1)$ | $Y_0(0)$ | $Y_1(0)$ | $Y_2(0)$ | $Y_3(0)$ | --- | $Y_3(2Nrb-2)$ | $Y_4(3Nrb-2)$ | $Y_5(2Nrb-2)$ | $Y_0(2Nrb-2)$ | $Y_1(2Nrb-1)$ | $Y_2(2Nrb-1)$ |

$12 \times Nrb$

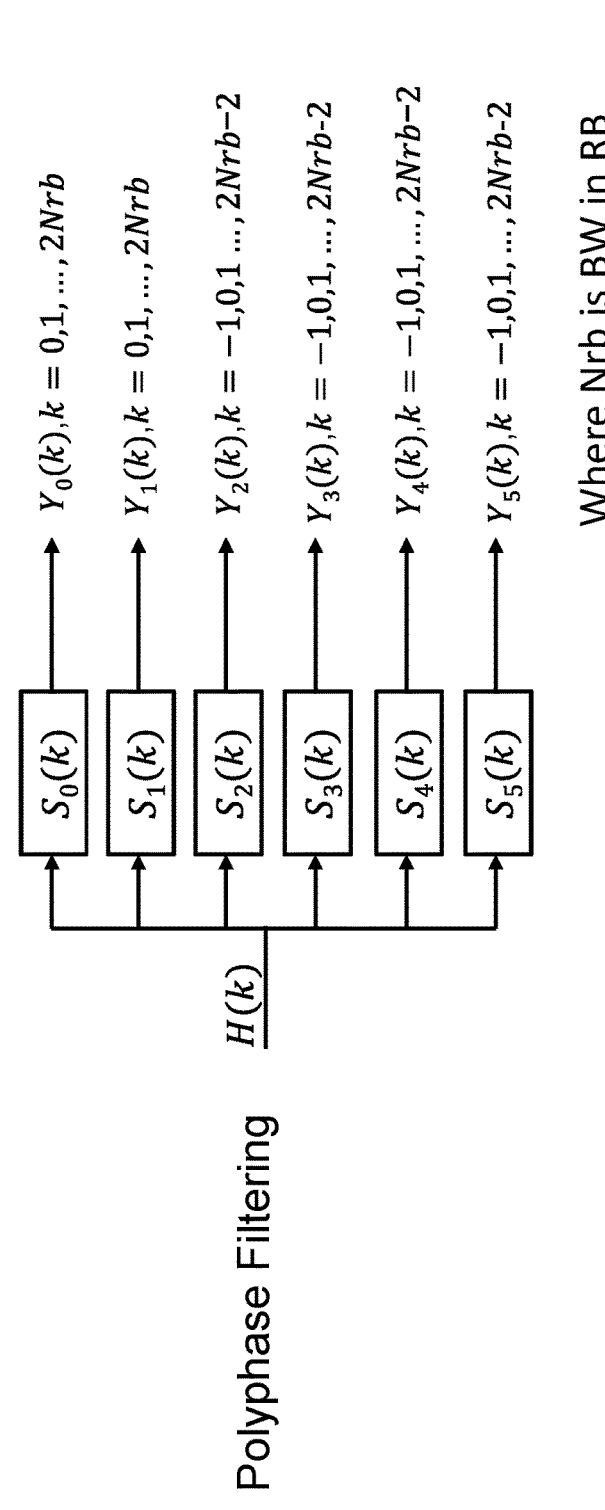

2400

For ports of CDM group3, with DMRS ConfigType=2

Let $H(k)$ be the LS channel estimate with edges extended and edges extrapolated Polyphase Filtering $H(k)$ $S_0(k)$ → $Y_0(k), k = 0,1,...,2Nrb$
$S_1(k)$ → $Y_1(k), k = 0,1,...,2Nrb$
$S_2(k)$ → $Y_2(k), k = -1,0,1,...,2Nrb-2$
$S_3(k)$ → $Y_3(k), k = -1,0,1,...,2Nrb-2$
$S_4(k)$ → $Y_4(k), k = -1,0,1,...,2Nrb-2$
$S_5(k)$ → $Y_5(k), k = -1,0,1,...,2Nrb-2$ Where Nrb is BW in RB Assembling the polyphase results into DMRS channel estimates

| $Y_2(-1)$ | $Y_3(-1)$ | $Y_4(-1)$ | $Y_5(-1)$ | $Y_0(0)$ | $Y_1(0)$ | $Y_2(0)$ | --- | $Y_2(2Nrb-2)$ | $Y_3(3Nrb-2)$ | $Y_4(2Nrb-2)$ | $Y_5(2Nrb-2)$ | $Y_0(2Nrb-1)$ | $Y_1(2Nrb-1)$ |

$12xNrb$

*FIG. 24*

SYSTEMS AND METHODS FOR IMPROVING DEMODULATION REFERENCE SIGNAL CHANNEL ESTIMATION

CROSS-REFERENCE TO RELATED APPLICATION

This application claims the benefit of U.S. Provisional Patent Application No. 63/331,484, filed Apr. 15, 2022, the disclosure of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 9-11 illustrate possible edge extension algorithms for small packets.

FIGS. 20-24 illustrate systems and methods for filtering channel estimation signals using polyphase filters and estimating DMRS channels based on the filtered results in accordance with some embodiments described herein.

Figure 1:
FIG. 1 shows a block diagram of a Multiple-Input, Multiple-Output (MIMO) system that includes an antenna panel that may receive radiations from one or more user equipment devices (UEs).
Figure 1:
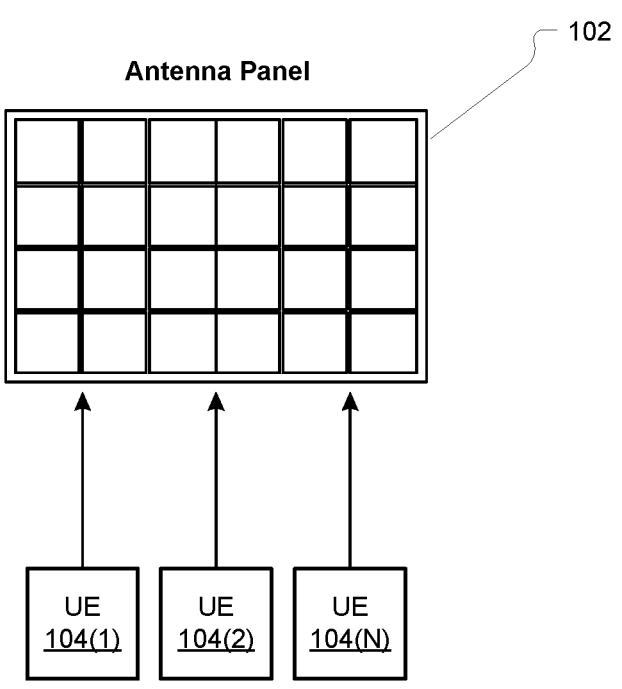

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

New Radio (NR) is a radio access technology (RAT) developed by the 3rd Generation Partnership Project (3GPP) for the fifth generation (5G) mobile network. In 5G NR, a physical uplink shared channel (PUSCH) is a physical uplink channel that carries user data from a UE device to a base station (BS). A DMRS is a reference signal associated with PUSCH. DMRS is used for channel estimation as part of coherent demodulation of PUSCH. The DMRS, known to both the BS and the UE, is sent by the UE, and is used by the BS receiver to acquire a propagation channel to recover data from each UE.

In some examples, a DMRS channel estimation architecture may include edge extrapolation for least-squares (LS) channel estimation to reduce edge effects. The "edge effect" may be a phenomenon that occurs when a signal is transformed using the fast Fourier transform (FFT) algorithm. An edge effect may occur due to the fact that the FFT assumes that the signal is periodic; any discontinuities or abrupt changes at the boundaries of the signal can cause artifacts in the frequency domain.

In general, for large packets, conventional edge extrapolation techniques may be effective to remove some edge effects. However, the resulting DMRS channel estimation may still be impacted on the edges. The impact of edge effects relative to the overall DMRS channel in a large band may be small because scrambling in the decoding process may spread edge impacts to the entire band. Thus, the net impact of edge effects may be insignificant for large packets.

However, the net impact of the edge effects may grow as the bandwidth (also "BW" herein) becomes smaller. Furthermore, in some examples (e.g., a multiuser environment with different user grouping of different user packet sizes, operating within a multi-core operational environment, etc.) large packets may also generally be broken into multiple resource block (RB) segments. In such examples, algorithm design may call for a smaller segment size without a significant compromise in performance.

For medium packets, such as bandwidths below 20 physical resource blocks (PRB), the net impact of edge effects on link performance becomes significant, especially for high order modulation such as 256 Quadrature Amplitude Modulation (QAM). This may limit the system throughput, especially for highly loaded systems with low latency requirement applications, where the system may be unable to allocate large bandwidth for individual or single users.

For smaller packets, such as only 1 or 2 PRBs in applications of short messaging with low latency, conventional edge extrapolation techniques may simply be ineffective because there might not be enough samples to effectively extrapolate. For example, in DMRS configuration type 1, one PRB may have only three samples of LS channel estimation; whereas, in DMRS configuration type 2, one PRB may have only two samples of LS channel estimation. Hence, the present application identifies and addresses a need for an improved systems and methods for DMRS channel estimation in 5G NR PUSCH that may reduce and/or mitigate edge effects for all packet sizes.

The present application is directed to systems and methods for improving DMRS channel estimation in 5G-NR PUSCH communications. As described in greater detail below, the systems and methods described herein may improve DMRS channel estimation by extending one or more edges of a received frequency-domain channel estimation signal that may include multiple DMRS samples. Embodiments may further extrapolate the one or more extended edges as part of an overall DMRS channel estimation architecture that may include additional FFT and/or inverse FFT (IFFT) operations, DMRS measurements, windowing operations, frequency interpolation operations, and so forth. Moreover, the systems and methods for edge extension described herein may, in some embodiments, be unique and distinct from conventional repetition of edge DMRS. Additional techniques are disclosed that may address all packet sizes (e.g., small packets of 1-2 RB, medium sized packets of up to twenty-five RB, large sized packets of greater than 25 RB, and so forth). In some examples of large packet sizes, edge extension may be skipped, with only a windowing operation after the edge extension being sufficient. In some examples, the windowing function may be a raised-cosine filter or any other suitable windowing function.

In addition, the systems and methods described herein are further directed to systems and methods for estimating DMRS channels by automatically designing polyphase filters based on one or more DMRS measurements taken from one or more augmented channel estimation signals. Such embodiments may have no need of one or more costly FFT and/or IFFT operations and may directly apply a low-pass polyphase filter to an edge-extended channel estimation signal to achieve noise reduction and edge interpolation in a single step.

The following will provide, with reference to FIGS. 1-4 and 6-24, detailed descriptions of systems for improving DMRS channel estimation. Detailed descriptions of corresponding computer-implemented methods will also be provided in connection with FIG. 5.

The time-frequency structure of DMRS depends on the type of waveform configured for PUSCH, as defined in 3rd Generation Partnership Project; Technical Specification Group Radio Access Network (TS) 38.211 "NR; Physical channels and modulation," §§ 6.4.1.1 and 6.4.1.2. The basic transmission scheme in NR is orthogonal frequency-division multiplexing (OFDM). NR supports a flexible OFDM numerology with subcarrier spacings ranging from 15 kHz up to 240 kHz with a proportional change in cyclic prefix (CP) duration.

In general, an uplink (UL) RB is the smallest resource allocation unit, which is 12 resource elements (RE) in the frequency domain and up to 14 symbols per slot. The frequency separation between REs may be referred to as sub-carrier spacing (SCS). As mentioned above, SCS may be $15 \times 2^{\mu}$ KHz, such that $\mu=0,1,2,3,4$, resulting in SCS values of 15 KHz, 30 KHz, 60 KHz, 120 KHz, and 240 KHz, respectively. A symbol duration $T_S$ may be related to SCS by $$T_s = \frac{1}{SCS}.$$

Each symbol has a cyclic prefix (CP) with a duration related to SCS or µ.

DMRS signals are partitioned into code division multiplexing (CDM) groups. Within CDM groups, ports are coded with an orthogonal cover code (OCC). DMRS has different configurations: configuration type 1 includes 2 CDM groups for OCC, with a frequency density of 3 DMRS anchors per RB per port, whereas configuration type 2 includes 3 CDM groups for OCC, with a frequency density of 2 DMRS anchors per RB per port. NR UL supports symbol sharing data and DMRS; configuration type 2 has lower DMRS cost if fewer ports are actually used. REs on unused CDM groups may be used for data, while unused ports within a used CDM may not be used for data. For example, in type 1 single symbol, a maximum of 4 ports are supported. If only port 2/3 is used, the DMRS position for port 0/1 can be used for data. Furthermore, discrete Fourier transform (DFT) spread coded OFDM (DFT-s-OFDM) (e.g., for data) is only defined for DMRS configuration type 1.

In general, massive MIMO systems use one or more antenna panels to receive radiations from multiple UEs, each sending a signal over the same radio resources. Data from a UE can be sent with one or more antenna ports. Each UE is allocated one or more unique antenna ports by a BS. FIG. 1 shows a block diagram of a MIMO system 100 that includes an antenna panel 102 that may receive radiations from one or more UE 104 (e.g., UE 104(1), UE 104(2), UE 104(N)). Note that although FIG. 1 shows three UEs, this is provided by way of example only and a MIMO system 100 may include any suitable number of UE devices.

Figure 2:
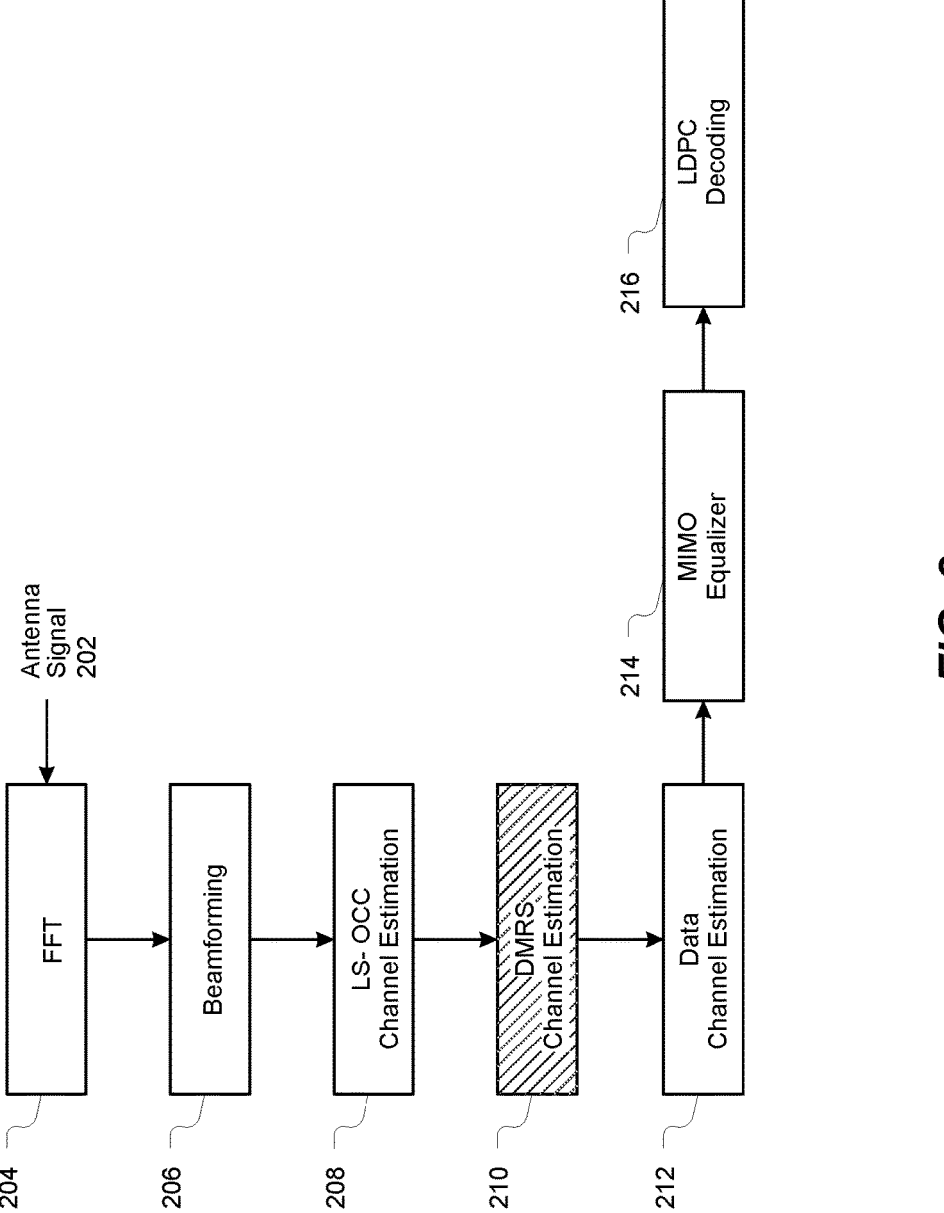
FIG. 2 shows a flow diagram for an example MIMO processing chain.
Figure 2:
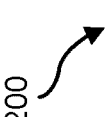

FIG. 2 shows a flow diagram for an example MIMO processing chain 200. As shown, the example massive MIMO processing chain 200 may include operations of receiving of an antenna signal 202, a fast Fourier transform (FFT) operation 204, a beamforming operation 206, an LS OCC channel estimation operation 208, a DMRS channel estimation operation 210, a data channel estimation operation 212, a MIMO equalizer operation 214, and a low-density parity check code (LDPC) decoding operation 216. In general, the systems and methods disclosed herein relate to the DMRS channel estimation operation 210.

In some examples, a DMRS channel estimation architecture may include edge extrapolation for LS channel estimation to reduce edge effects that may be introduced by an IFFT. The IFFT may be implemented to convert the channel estimation signal from the frequency domain to the time domain and to further apply noise reduction. In some examples, an additional windowing operation may be applied after the IFFT to reduce noise on the channel estimation signal. Likewise, a zero-insertion operation may be performed to interpolate the noise-reduced channel estimation signal in the frequency domain from a density of ¼ or ⅙ to a density of 1. An FFT may then be performed to bring the noise-reduced channel estimation signal back to the frequency domain.

Figure 3:
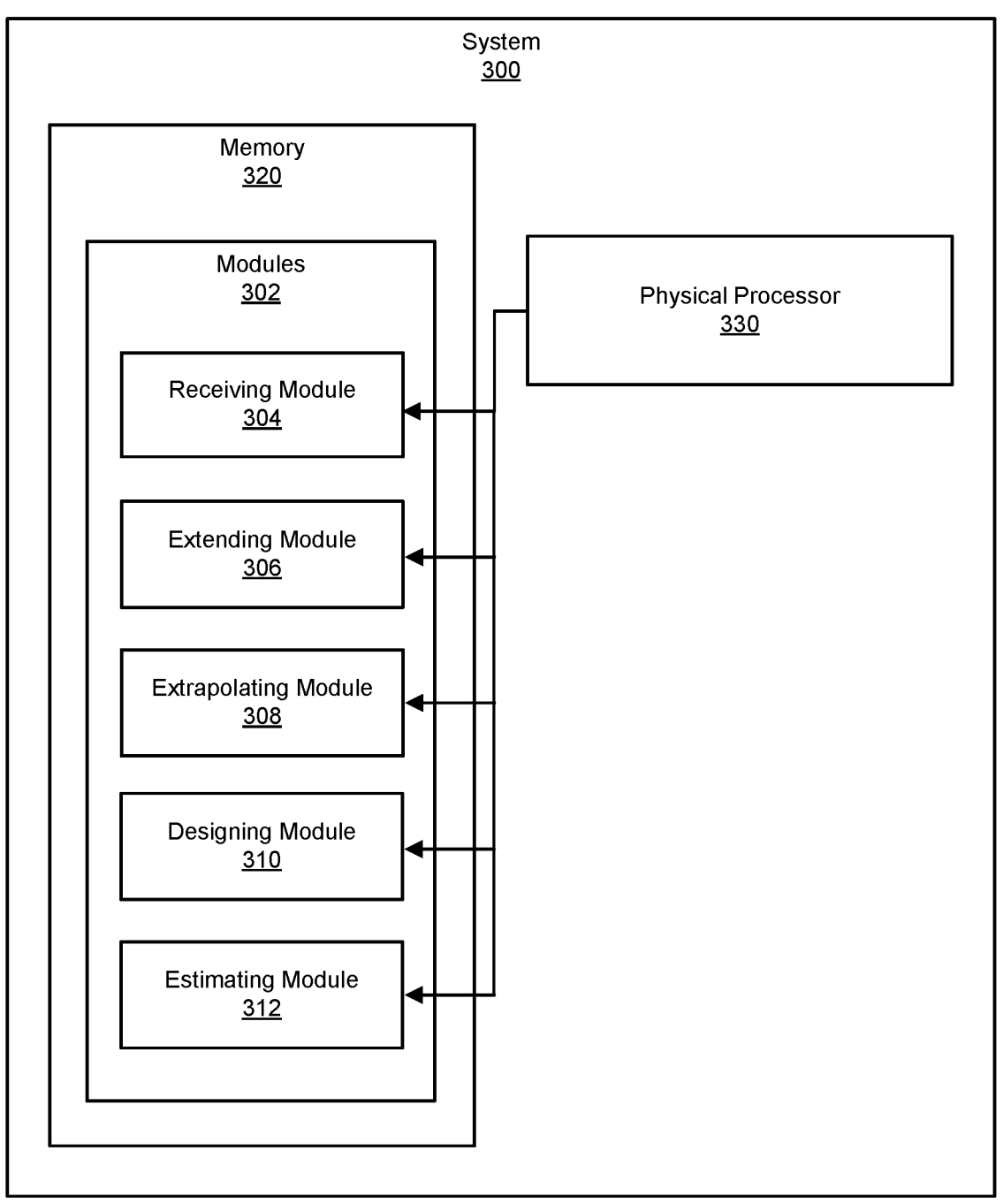
FIG. 3 is a block diagram of an example system for improving demodulation reference signal (DMRS) channel estimation.

FIG. 3 is a block diagram of an example system 300 for improving DMRS channel estimation. As illustrated in this figure, example system 300 may include one or more modules 302 for performing one or more tasks. As will be explained in greater detail below, modules 302 may include a receiving module 304 that receives, as part of a DMRS channel estimation operation, a DMRS comprising a plurality of DMRS samples.

Example system 300 may also include an extending module 306 that generates an extended channel estimation signal by determining at least one extended DMRS sample that extends at least one edge of the channel estimation signal. As further illustrated in FIG. 3, example system 300 may also include an extrapolating module 308 that generates an augmented channel estimation signal by extrapolating, based on the extended channel estimation signal, a frequency edge for the augmented channel estimation signal.

In some examples, as shown in FIG. 3, example system 300 may also include a designing module 310 that designs, based on a measurement of a DMRS value included in the augmented channel estimation signal, a polyphase filter, and a estimating module 310 that estimates a DMRS channel by filtering the augmented channel estimation signal using the designed polyphase filter.

As also illustrated in FIG. 3, example system 300 may also include one or more memory devices, such as memory 320. Memory 320 generally represents any type or form of volatile or non-volatile storage device or medium capable of storing data and/or computer-readable instructions. In one example, memory 320 may store, load, and/or maintain one or more of modules 302. Examples of memory 320 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 3, example system 300 may also include one or more physical processors, such as physical processor 330. Physical processor 330 generally represents any type or form of hardware-implemented processing unit capable of interpreting and/or executing computer-readable instructions. In one example, physical processor 330 may access and/or modify one or more of modules 302 stored in memory 320. Additionally or alternatively, physical processor 330 may execute one or more of modules 302 to facilitate improving of DMRS channel estimation. Examples of physical processor 330 include, without limitation, microprocessors, microcontrollers, central processing units (CPUs), Field-Programmable Gate Arrays (FPGAs) that implement softcore processors, Application-Specific Integrated Circuits (ASICs), digital signal processors (DSPs), portions of one or more of the same, variations or combinations of one or more of the same, or any other suitable physical processor.

Figure 4:
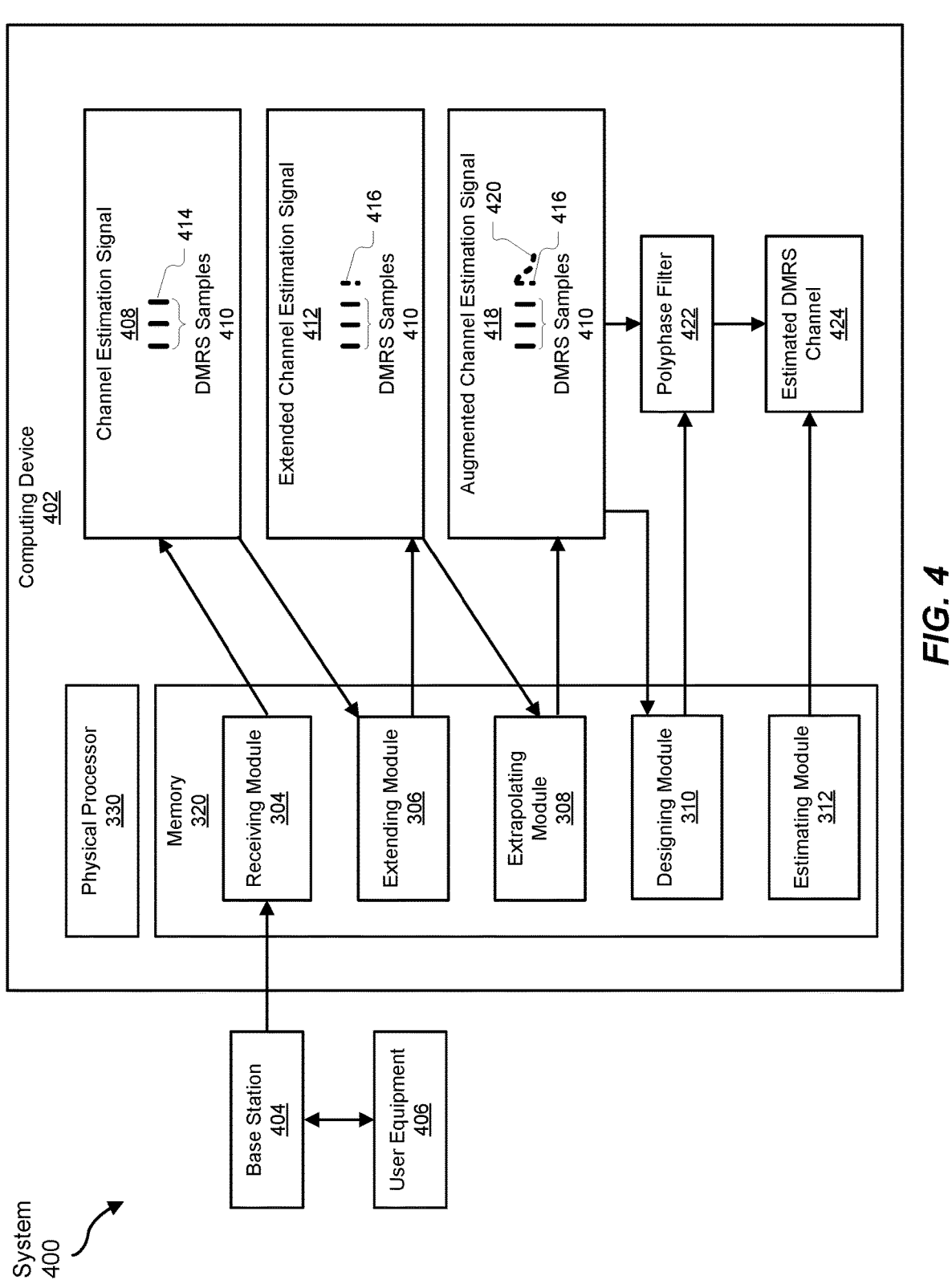
FIG. 4 is a block diagram of an example implementation of a system for improving DMRS channel estimation.

Example system 300 in FIG. 3 may be implemented in a variety of ways. For example, all or a portion of example system 300 may represent portions of an example system 400 ("system 400") in FIG. 4. As shown in FIG. 4, system 400 may include computing device 402 in communication with a base station 404. Base station 404 may further be in communication with a user equipment 406. In at least one example, computing device 402 may be programmed with one or more of modules 302.

In at least one embodiment, one or more of modules 302 from FIG. 3 may, when executed by computing device 402, enable computing device 402 to perform one or more operations to improve DMRS channel estimation. For example, as will be described in greater detail below, receiving module 304 may cause computing device 402 to receive, as part of a DMRS channel estimation operation, a frequency domain channel estimation signal (e.g., channel estimation signal 408) that includes a plurality of DMRS samples (e.g., DMRS samples 410).

Additionally, extending module 306 may cause computing device 402 to generate an extended channel estimation signal (e.g., extended channel estimation signal 412). For example, in some embodiments, extending module 306 may cause computing device 402 to generate the extended channel estimation signal by determining at least one extended DMRS sample (e.g., extended channel estimation signal 412) that extends at least one edge of the channel estimation signal. In some examples, extending module 306 may cause computing device 402 to generate the extended channel estimation signal based on an edge DMRS sample included in the DMRS samples (e.g., edge DMRS sample 414), and the extended channel estimation signal may include at least one extended DMRS sample (e.g., extended DMRS sample 416).

Moreover, as will be described in greater detail below, extrapolating module 308 may cause computing device 402 to generate an augmented channel estimation signal (e.g., augmented channel estimation signal 418) by extrapolating, based on the extended channel estimation signal, a frequency edge (e.g., frequency edge 420) for the augmented channel estimation signal.

In some examples, designing module 310 may cause computing device 402 to design, based on a measurement of a DMRS value included in the augmented channel estimation signal, a polyphase filter (e.g., polyphase filter 422). Furthermore, in some examples, estimating module 312 may cause computing device 402 to estimate a DMRS channel (e.g., estimated DMRS channel 424) by filtering the augmented channel estimation signal using the designed polyphase filter.

Computing device 402 generally represents any type or form of computing device capable of reading and/or executing computer-executable instructions and/or hosting executables. Examples of computing device 402 include, without limitation, application servers, storage servers, database servers, web servers, signal processing devices, and/or any other suitable computing device configured to run certain software applications and/or provide various application, storage, and/or signal processing services.

In at least one example, computing device 402 may be a computing device programmed with one or more of modules 302. All or a portion of the functionality of modules 302 may be performed by computing device 402 and/or any other suitable computing system. As will be described in greater detail below, one or more of modules 302 from FIG. 3 may, when executed by at least one processor of computing device 402, enable computing device 402 to improve DMRS channel estimation by reducing edge effects for one or more signals used for a DMRS channel estimation process.

Base station 404 may generally represent an element within a wireless communication system (e.g., system 400) that provides radio coverage and connectivity to user equipment (e.g., user equipment 406) within a specific area or cell. A 5G base station may also be referred to as a gNodeB (gNB). Base station 404 may include a variety of components including, without limitation, an antenna array, a transceiver unit, and one or more baseband processing units. The antenna array may be used to transmit and receive radio signals, while the transceiver unit may be responsible for processing the signals and converting them to digital data that can be sent to the baseband processing units. The baseband processing units may be responsible for performing signal processing, error correction, and modulation and demodulation of the signals. Although not so illustrated in FIG. 4, in some examples, computing device 402 may be included as part of base station 404 and/or may be in communication with one or more components of base station 404.

User equipment 406 may include any mobile device or endpoint that connects to a 5G network to access various services, such as voice, video, and data communication. user equipment 406 can be a smartphone, tablet, laptop, or any other wireless device that is designed to operate with 5G networks. In some examples, user equipment 406 may include a 5G modem, one or more antennas, and/or any other suitable hardware that may facilitate communication with base station 404.

Many other devices or subsystems may be connected to system 300 in FIG. 3 and/or system 400 in FIG. 4. Conversely, all of the components and devices illustrated in FIGS. 3 and 4 need not be present to practice the embodiments described and/or illustrated herein. The devices and subsystems referenced above may also be interconnected in different ways from those shown in FIG. 4. Systems 300 and 400 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 5:
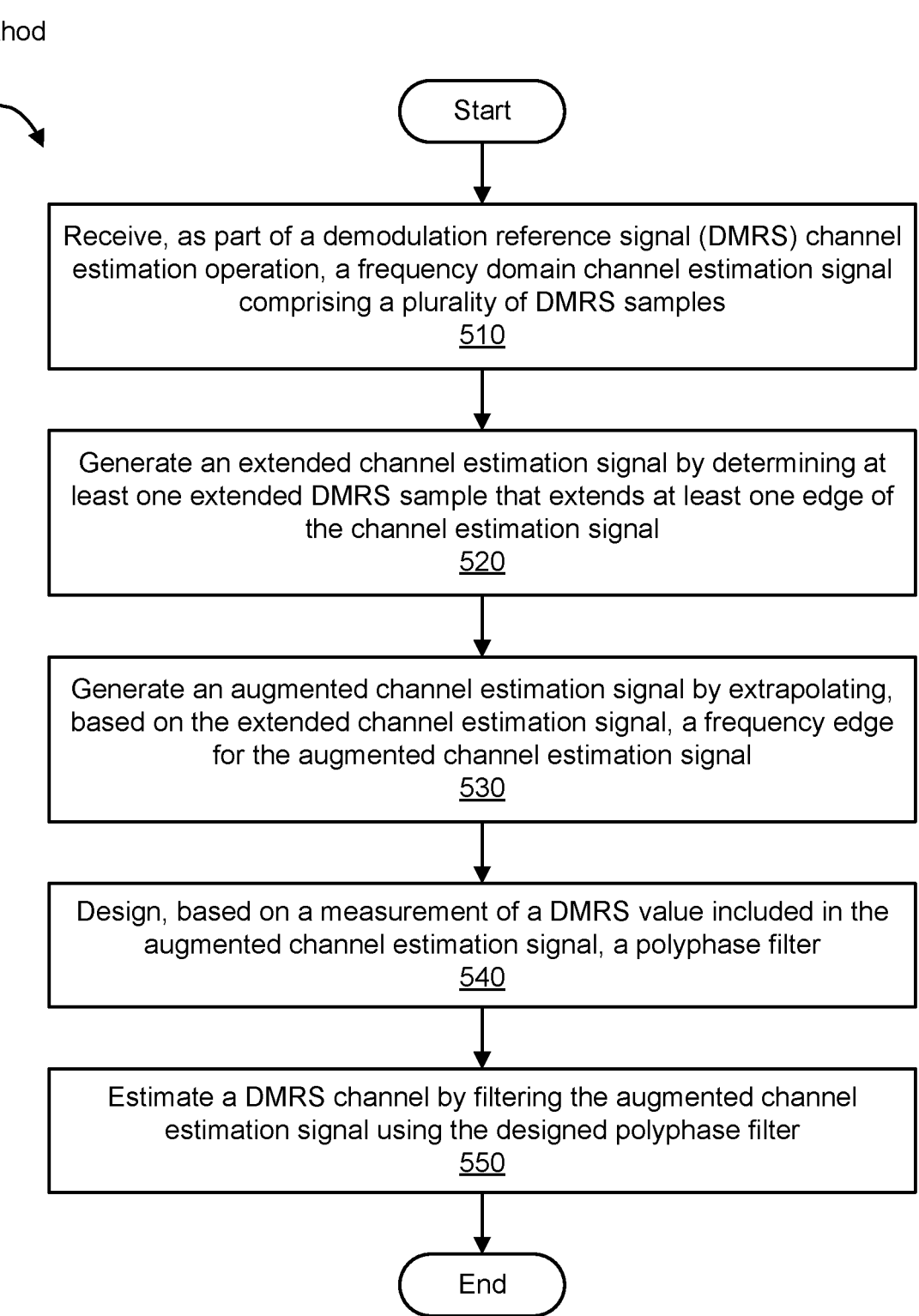
FIG. 5 is a flow diagram of an example method for improving DMRS channel estimation.

FIG. 5 is a flow diagram of an example computer-implemented method 500 for allocating shared resources in multi-tenant environments. The steps shown in FIG. 5 may be performed by any suitable computer-executable code and/or computing system, including system 300 in FIG. 3, system 400 in FIG. 4, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 510, one or more of the systems described herein may receive, as part of a DMRS channel estimation operation, a frequency domain channel estimation signal that includes a plurality of DMRS samples. For example, receiving module 304 may, as part of computing device 402, cause computing device 402 to receive channel estimation signal 408 that includes DMRS samples 410.

Receiving module 304 may cause computing device 402 to receive channel estimation signal 408 in a variety of contexts. For example, user equipment 406 may seek to establish an uplink with base station 404. User equipment 406 may send a DMRS to base station 404 as part of the uplink transmission. As mentioned above, the DMRS contains a specific pattern of bits that may allow base station 404 to identify and extract the signal from the received waveform. The DMRS may help to mitigate the effects of interference and noise in the wireless channel and improve the reliability and performance of the communication system.

As mentioned above in reference to FIG. 2, a base station (e.g., base station 404) may perform one or more processes on a received antenna signal (e.g., antenna signal 202) prior to a DMRS channel estimation operation (e.g., DMRS channel estimation operation 210). For example, as shown in FIG. 2, a base station may perform an FFT operation (e.g., FFT operation 204), a beamforming operation (e.g., beamforming operation 206), and an LS OCC channel estimation operation (e.g., LS OCC channel estimation operation 208) prior to passing a frequency domain channel estimation signal that includes a plurality of DMRS samples (e.g., channel estimation signal 408 that includes DMRS samples 410) as input to a DMRS channel estimation operation (e.g., DMRS channel estimation operation 210). LS OCC channel estimation operation 208 is to obtain a raw channel estimation signal for each pair of port(s) and antenna(s). Once LS OCC channel estimation operation 208 obtains the raw channel estimation signal, the raw channel estimation signal is passed to the DMRS channel estimation operation 210 to further process the raw channel estimation signal to improve the accuracy and reliability of data demodulation in the uplink transmission.

Hence, receiving module 304 may cause computing device 402 to receive channel estimation signal 408 from one or more components of base station 404.

Returning to FIG. 5, at step 520, one or more of the systems described herein may generate an extended channel estimation signal. For example, extending module 306 may, as part of computing device 402, cause computing device 402 to generate extended channel estimation signal 412.

As further shown in FIG. 5, one or more of the systems described herein may generate the extended channel estimation signal by determining at least one extended DMRS sample that extends at least one edge of the channel estimation signal based on (1) an edge DMRS sample included in the plurality of DMRS samples at the edge of the channel estimation signal, and (2) at least one additional DMRS sample included in the plurality of DMRS samples. For example, extending module 306 may cause computing device 402 to generate extended channel estimation signal 412 by determining, based on edge DMRS sample 414 and at least one other DMRS sample included in DMRS samples 410, extended DMRS sample 416.

FIG. 5 also shows that one or more of the systems described herein may generate the extended channel estimation signal by also extending the edge of the channel estimation signal by including the plurality of DMRS samples and the at least one extended DMRS sample as part of the extended channel estimation signal. For example, extending module 306 may cause computing device 402 to generate extended channel estimation signal 412 by extending the edge of channel estimation signal 408 by including DMRS samples 410 and extended DMRS sample 416 in extended channel estimation signal 412.

In some examples, extending module 306 may apply different edge extension techniques and/or algorithms depending on a size of a received packet. For example, FIG. 6 includes a diagram 600 that illustrates a possible algorithm for right edge extension for large packets (e.g., packets greater than 25 RB). In this example, extending module 306 may select the additional DMRS sample from the plurality of DMRS samples (e.g., DMRS samples 410) based on a target frequency interval between the extended DMRS sample (e.g., extended DMRS sample 416) and the edge DMRS sample (e.g., edge DMRS sample 414). Extending module 306 may further determine the extended DMRS sample (e.g., a magnitude or phase of the extended DMRS sample) based on a relationship between a magnitude or phase of the extended DMRS sample and a magnitude or phase of the selected additional DMRS sample, such as a normalized spectral density of the edge DMRS sample and a complex conjugate of the selected additional DMRS sample.

Figure 6:
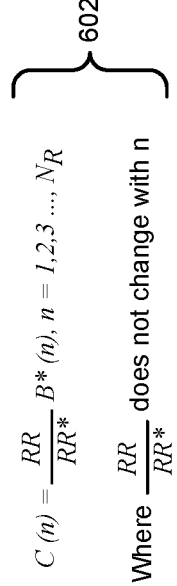
FIG. 6 includes a diagram that illustrates a possible algorithm for right edge extension for large packets.
Figure 6:
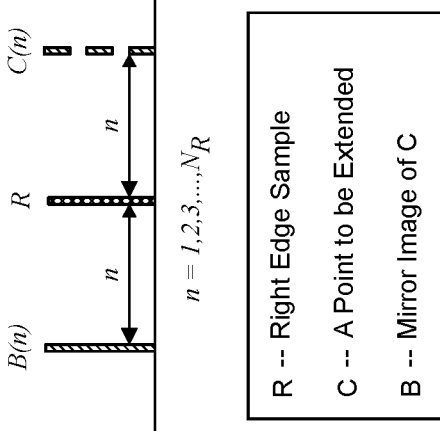
Figure 6:
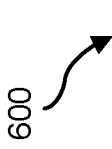

In FIG. 6, the illustrated algorithm may extend a right edge by $N_R$ samples. As illustrated, R represents a right edge sample (e.g., edge DMRS sample 414) and C represents an extended DMRS sample to be generated (e.g., extended DMRS sample 416) at a target frequency interval n from R. B represents a "mirror image" of C: a sample from the plurality of DMRS samples that is a target frequency interval of n from R. Extending module 306 may determine a value of C(n) based on a normalized power spectral density of R(n) and a complex conjugate of B(n) (e.g., $$\frac{RR}{RR^*}B^*(n)$$

in accordance with function 602.

Figure 7:
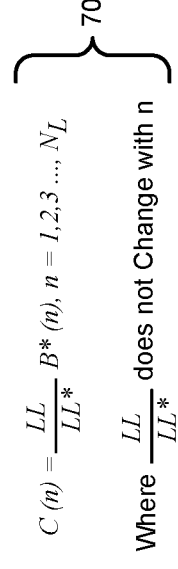
FIG. 7 includes a diagram that illustrates a possible algorithm for left edge extension for large packets.
Figure 7:
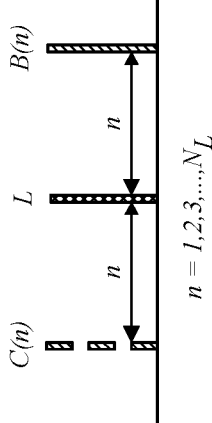

Likewise, FIG. 7 includes a diagram 700 that illustrates a possible algorithm for left edge extension for large packets (e.g., greater than 25 RB) that may extend a left edge by $N_L$ samples. As shown, L represents a left edge sample (e.g., edge DMRS sample 414) and C represents an extended DMRS sample to be generated (e.g., extended DMRS sample 416) at a target frequency interval n from L. B represents a "mirror image" of C: a sample from the plurality of DMRS samples that is a target frequency interval of n from L. Extending module 306 may determine a value of C(n) based on a normalized power spectral density of L(n) and a complex conjugate of B(n) (e.g., $$\frac{LL}{LL^*}B^*(n)$$

in accordance with function 702.

In many cases, $N_L \leq 16$ and $N_R \leq 16$, but $N_L = N_R$ is not required. In cases where $N_L = N_R \geq 16$, a windowing function may be applied to extended $N_R$ and $N_L$ samples on the right and left edges prior to or as part of an edge extrapolation (e.g., by extrapolating module 308, as will be described in greater detail below in reference to FIG. 13). The windowing function may be a raised-cosine filter or other suitable windowing function (e.g., Hamming window, Blackman window, Kaiser window, etc.) and may be applied to any suitable number of samples (e.g., one sample, two samples, twelve samples, etc.) on each edge. In some examples, this technique may be referred to as "edge taping".

Figure 8:
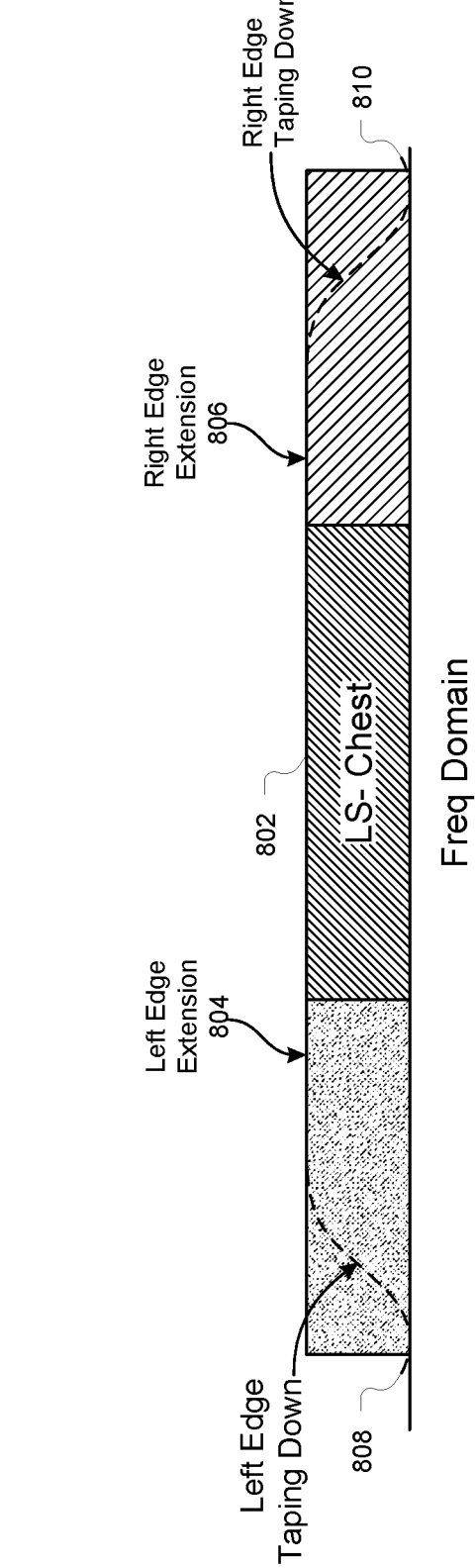
FIG. 8 illustrates an additional or alternative edge extension algorithm for large packets that further includes a windowing function.

FIG. 8 includes a plot 800 that illustrates an additional or alternative edge extension algorithm for large packets that further includes a windowing function. As shown in FIG. 8, channel estimation signal 802 has been extended by extending module 306, generating left edge extension 804 and right edge extension 806. In this example, one or more of the systems described herein (e.g., receiving module 304, extending module 306, and/or extrapolating module 308) may have applied a windowing function to left edge extension 804 and/or right edge extension 806, "taping down" left edge extrapolation 808 and right edge extrapolation 810.

In some embodiments, the systems and methods described herein may provide edge extension for smaller packets (e.g., packets having a BW of 1 or 2 RB). In such examples, embodiments of the systems and methods described herein (e.g., one or more of modules 302) may perform multiple extensions in multiple iterations. For example, a channel estimation signal may include both a left edge DMRS sample and a right edge DMRS sample, and extending module 306 may generate the extended channel estimation signal (e.g., extended channel estimation signal 412) by determining at least one left edge extended DMRS sample that extends the left edge of the channel estimation signal and by determining at least one right edge extended DMRS sample that extends the right edge of the channel estimation signal (e.g., extended DMRS sample 416). Extending module 306 may further extend the edge of the channel estimation signal by including left edge extended DMRS sample, the plurality of DMRS samples (e.g., DMRS samples 410), and the right edge extended DMRS sample as part of the extended channel estimation signal.

In additional embodiments, extending module 306 may further extend the channel estimation signal by performing an additional extension, using the first extended channel estimation signal as input to an additional extension operation. Extending module 306 may then extend the first extended channel estimation signal by determining at least one extended intermediate left edge DMRS sample that extends the first extended left edge of the first extended channel estimation signal, determining at least one extended intermediate right edge DMRS sample that extends the first extended right edge of the first extended channel estimation signal. Extending module 306 may then extend the edge of the channel estimation signal by including the at least one extended intermediate left edge DMRS sample, the first extended channel estimation signal, and the at least one extended intermediate right edge DMRS sample as part of the extended channel estimation signal.

Figure 9:
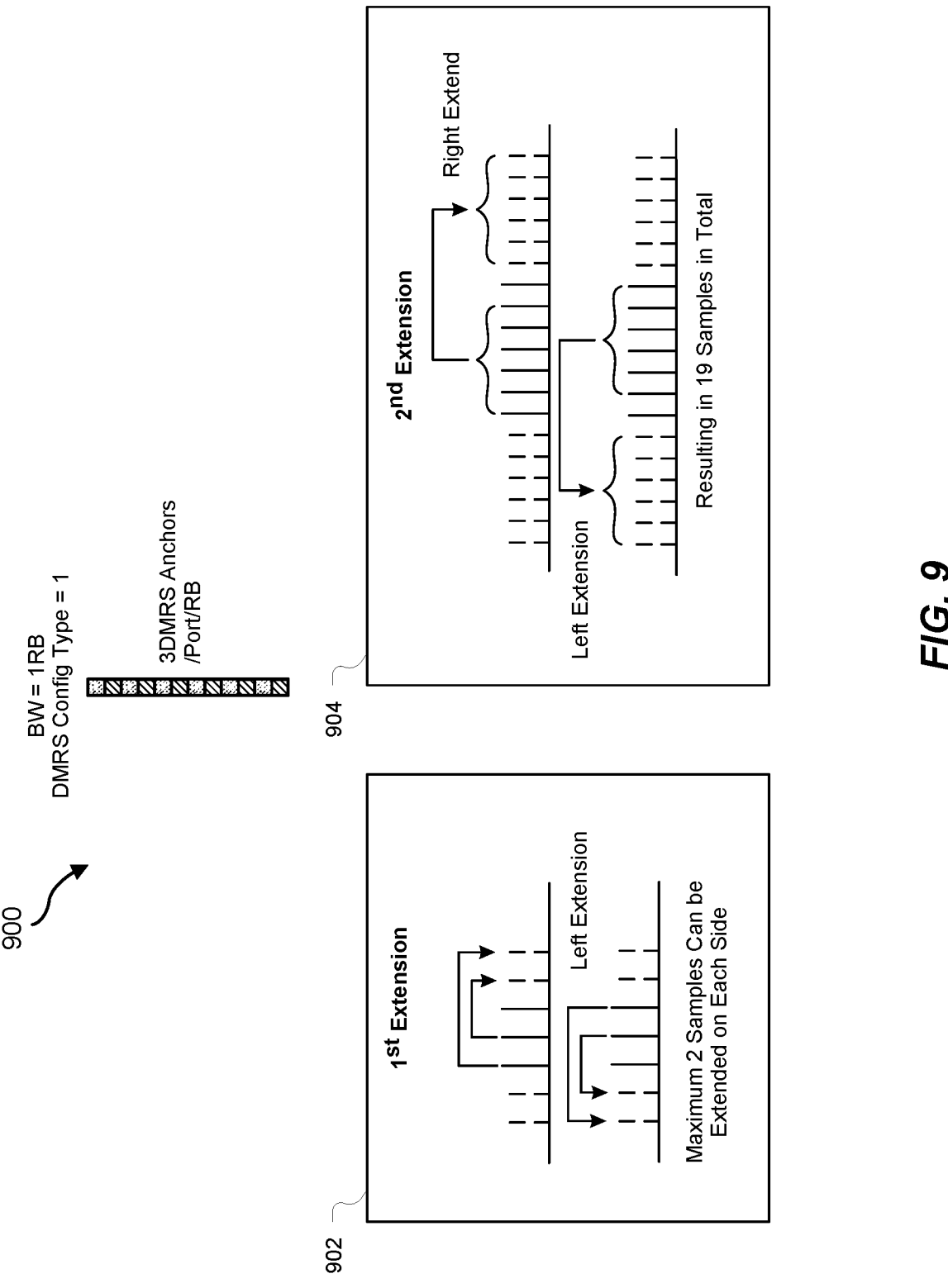
Figure 10:
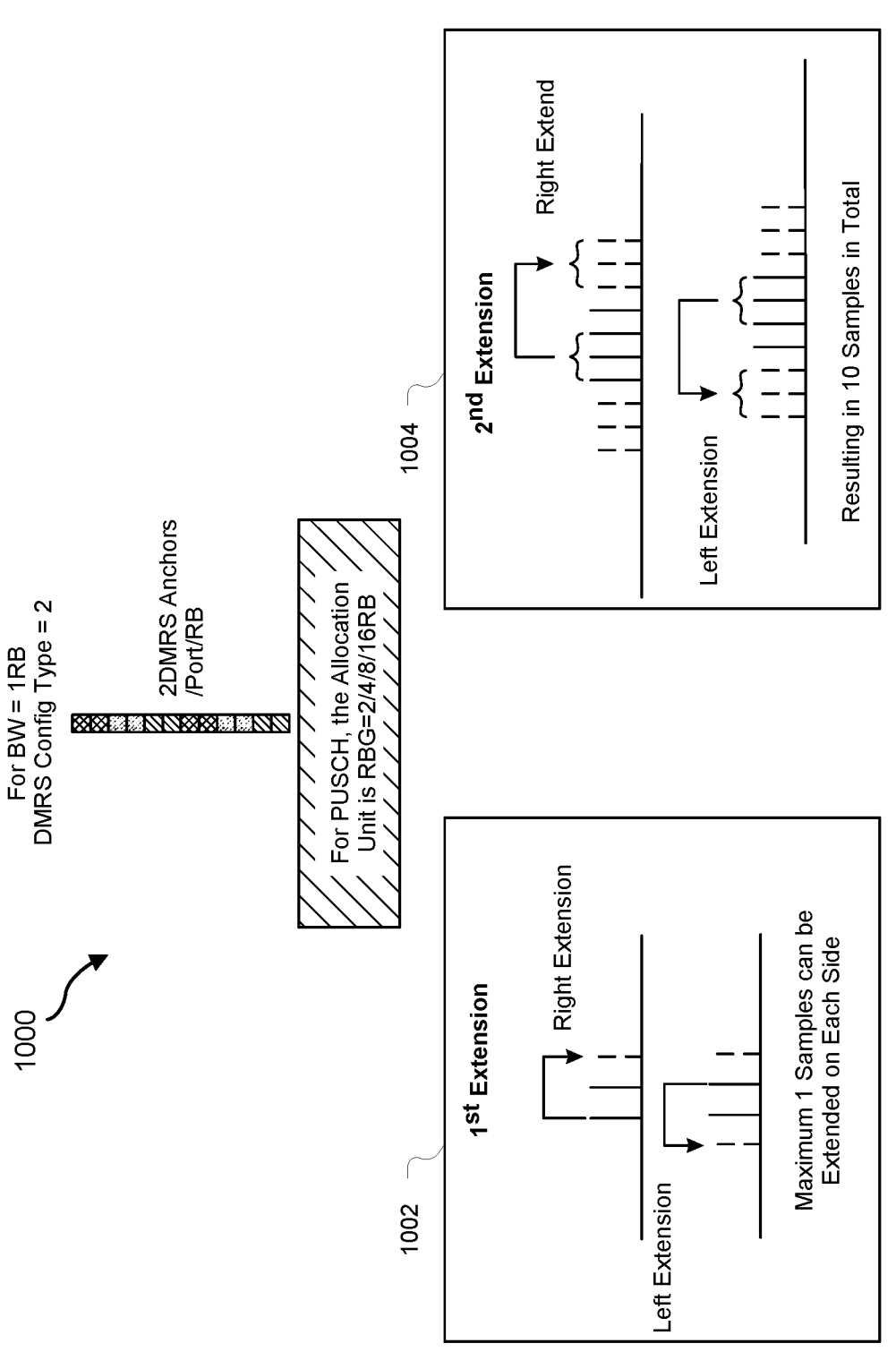

FIG. 9 and FIG. 10 illustrate example edge extension algorithms for packets having a bandwidth of 1 RB. In FIG. 9, diagram 900 illustrates that, for DMRS configuration type 1, there may be three DMRS anchors per port per RB. Diagram 902 shows that a first extension may extend up to two samples on each side. A second extension, as shown in diagram 904, may result in 19 samples in total. Moving to FIG. 10, diagram 1000 illustrates that, in DMRS configuration type 2, there may be two DMRS anchors per port per RB. Diagram 1002 shows that a first extension may extend one sample on each side, and diagram 1004 shows that a second extension may result in 10 samples total.

FIG. 11 illustrates an edge extension algorithm for small packets having a BW of two RBs. As shown in diagram 1100, for DMRS configuration type 1, there may be three DMRS anchors per port per RB. Thus, as shown in diagram 1102, five samples may be extended on each side, resulting in 16 samples total. As shown in diagram 1104, there may be two DMRS anchors per port per RB. Thus, as shown in diagram 1106, three samples may be extended on each side, resulting in seven samples total.

Figure 12:
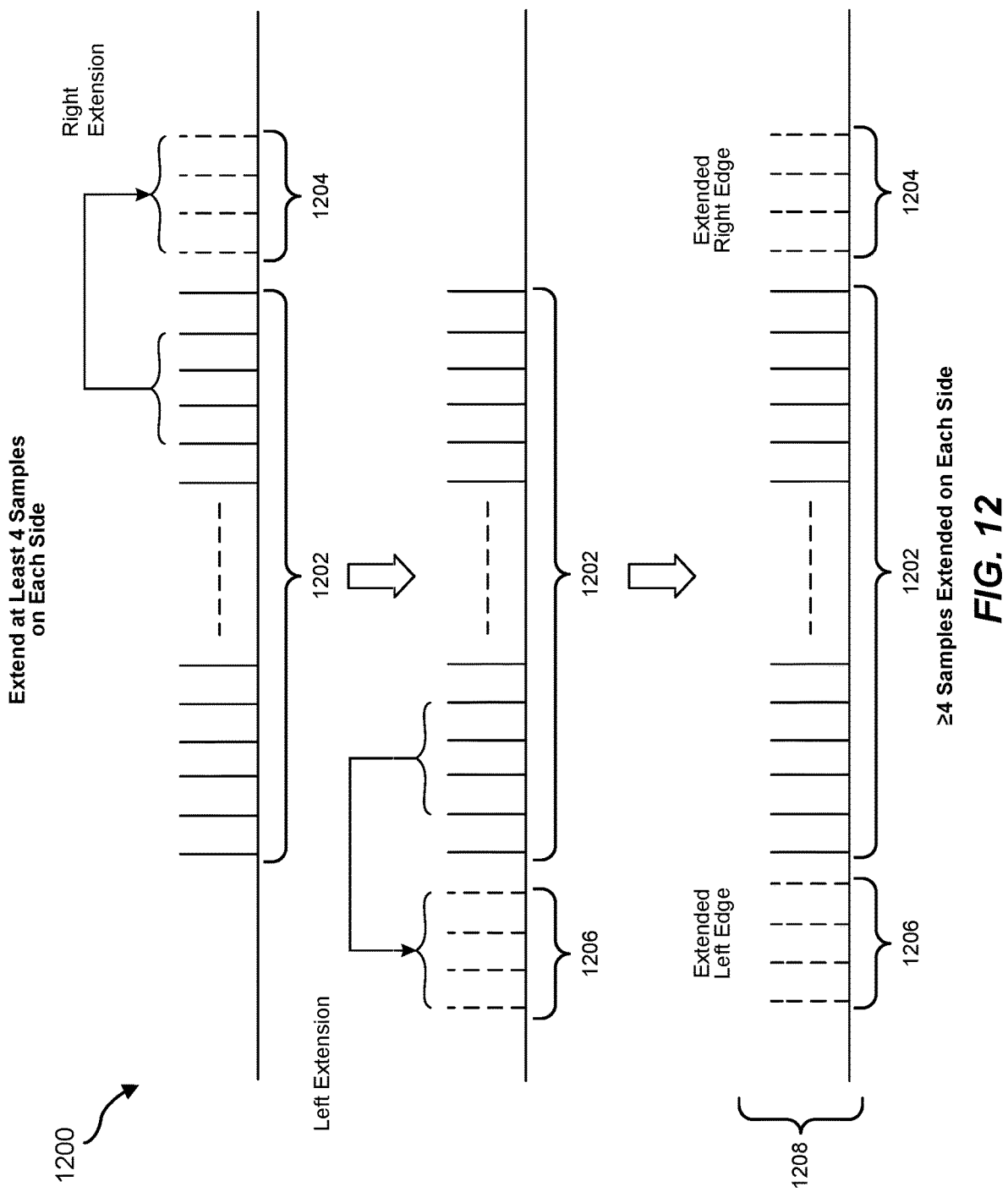
FIG. 12 illustrates an edge extension algorithm for medium-sized packets.
Figure 13:
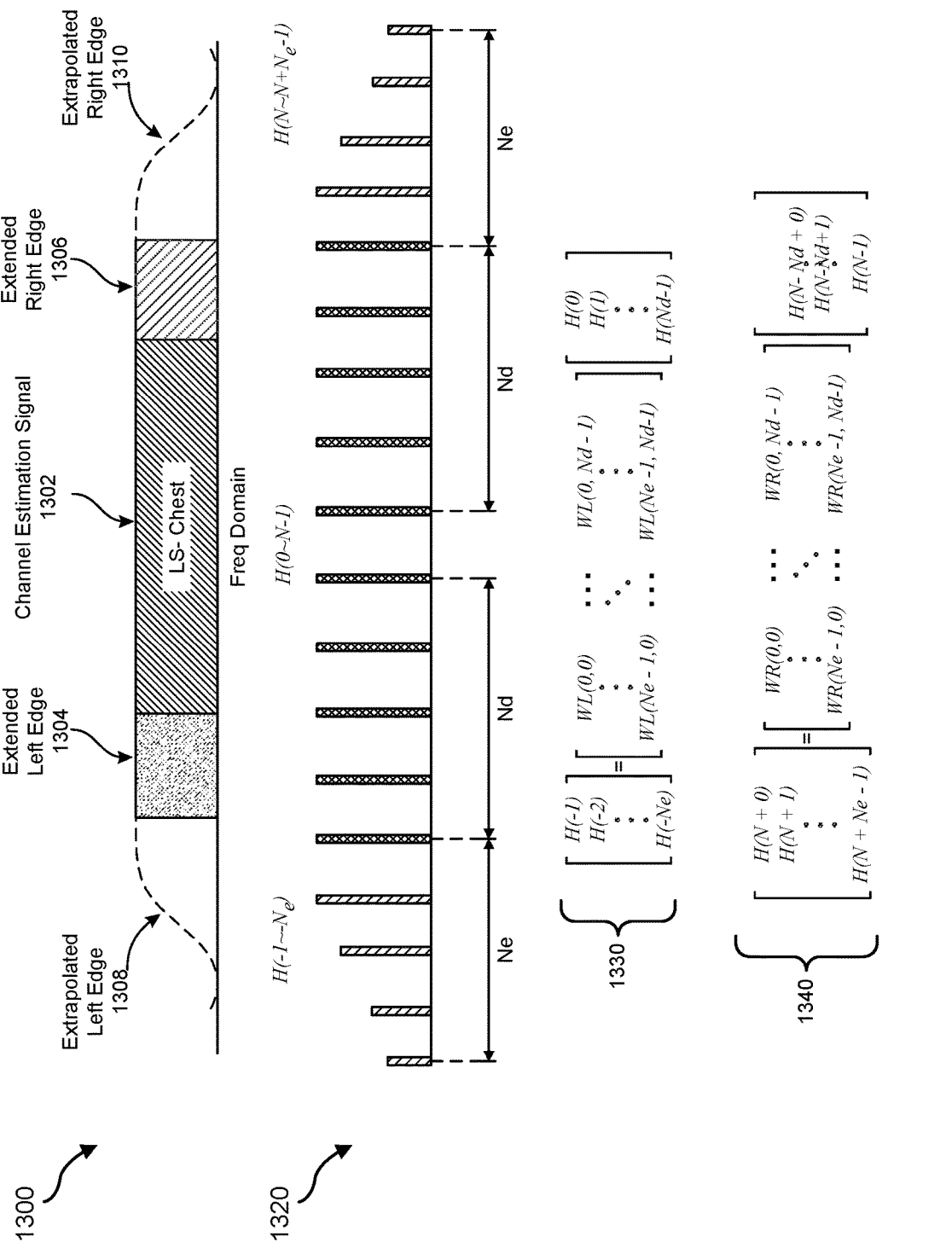
FIG. 13 includes a diagram that illustrates a possible edge extrapolation algorithm in accordance with the DMRS channel estimation and extrapolation architecture described herein.

FIG. 12 shows a diagram 1200 that illustrates an edge extension algorithm for medium-sized packets in the range of two RBs up to 25 RBs. In this example, the edges may be extended by at least four samples on each side. As shown, extending module 306 may perform a right extension operation using DMRS samples 1202, generating extended right edge 1204. Extending module 306 may further perform a left extension operation using DMRS samples 1202, generating extended left edge 1206. Extending module 306 may then generate an extended channel estimation signal 1208 by including extended left edge 1206, DMRS samples 1202, and extended right edge 1204 in the extended channel estimation signal.

In summary, extending module 306 may extend the original channel estimation signal (i.e., output from a LS OCC channel estimation process) by determining additional DMRS samples at one or both of the left and right edges. This edge extension may improve channel estimation in 5G NR PUSCH, ultimately enhancing the quality of a received uplink signal.

Returning to FIG. 5, at step 530, one or more of the systems described herein may generate an augmented channel estimation signal by extrapolating, based on the extended channel estimation signal, a frequency edge for the augmented channel estimation signal. For example, extrapolating module 308 may, as part of computing device 402, cause computing device 402 to generate augmented channel estimation signal 418 by extrapolating, based on extended channel estimation signal 412, frequency edge 420 for augmented channel estimation signal 418.

Extrapolating module 308 may extrapolate frequency edge 420 in a variety of contexts. For example, extrapolating module 308 may, as described above in reference to FIG. 8, when a packet size meets a predetermined threshold, apply a windowing function (e.g., a raised cosine window, a Hamming window, a Hann window, etc.) to at least a portion of a plurality of extended DMRS samples prior to or as part of extrapolating a frequency edge for the extended channel estimation signal.

Additionally or alternatively, for smaller or medium sized packets (e.g., packets where BW is less than 25 RBs), extrapolating module 308 may extrapolate frequency edge 420 by applying a precalculated interpolation matrix to the edge of the extended channel estimation signal. By way of illustration, FIG. 13 includes a diagram that illustrates a possible edge extrapolation algorithm. Frequency domain plot 1300 shows an extended channel estimation signal with extrapolated edges. As shown, channel estimation signal 1302 has an extended left edge 1304 and an extended right edge 1306. Extrapolating module 308 may therefore execute a left edge extrapolation operation using channel estimation signal 1302, extended left edge 1304, and/or extended right edge 1306 to generate extrapolated left edge 1308. Similarly, extrapolating module 308 may execute a right edge extrapolation operation using channel estimation signal 1302, extended left edge 1304, and/or extended right edge 1306 to generate extrapolated right edge 1310.

Frequency domain plot 1320 illustrates a frequency domain plot 1320 that describes different portions, bins, or segments of an extended channel estimation signal that may be used to extrapolate a left and a right edge using left matrix operation 1330 and matrix operation 1340, respectively. In some embodiments, interpolation matrices $W_L$ and $W_R$ may be applied to different portions of a channel to further extend the right and left edges, respectively.

In some examples, the interpolation matrices $W_L$ and $W_R$ may be predetermined (e.g., pre-calculated) and may be determined based on Weiner filter theory. A Wiener filter may be used to produce an estimate of a desired or target random process by linear time-invariant (LTI) filtering of an observed noisy process and additive noise, assuming a known stationary signal and noise spectra. A Wiener filter may minimize a mean square error (MSE) between an estimated random process and a desired process.

Figure 14:
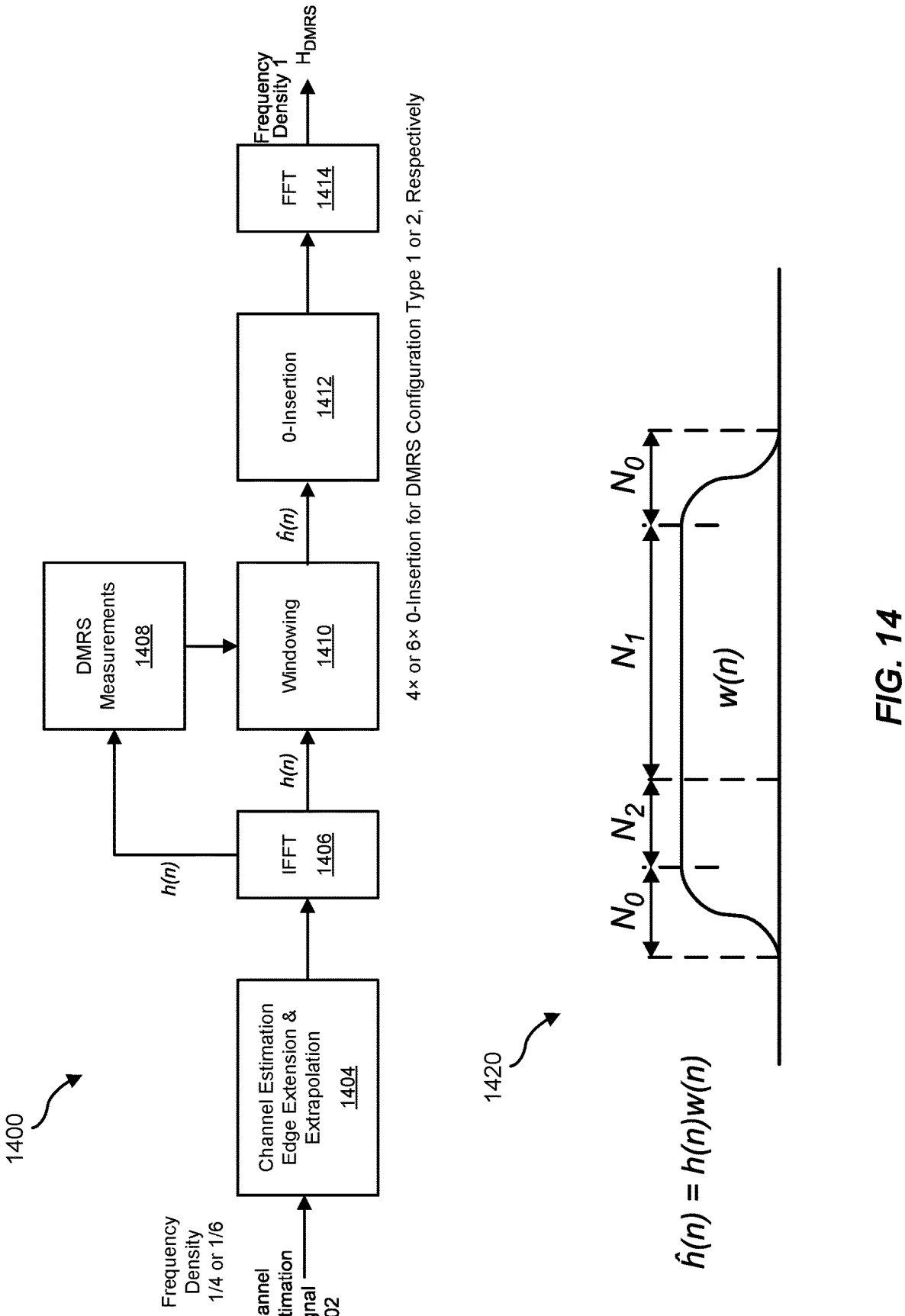
FIG. 14 illustrates additional or alternative example algorithms or methods for further improving DMRS channel estimation in accordance with the DMRS channel estimation and extrapolation architecture disclosed herein.

One or more of modules 302 (e.g., one or more of receiving module 304, extending module 306, and/or extrapolating module 308) may perform one or more additional operations to further improve DMRS channel estimation in accordance with the architecture disclosed herein. FIG. 14 includes a block diagram 1400 of possible additional operations that one or more of modules 302 may perform to further improve DMRS channel estimation.

As shown in block diagram 1400, one or more of modules 302 may cause a channel estimation signal 1402 (such as channel estimation signal 408) to undergo a channel extension and extrapolation process 1404. In some examples, the channel extension and extrapolation process 1404 may include or represent any of the operations described above in relation to modules 302, which may result in an augmented channel estimation signal (e.g., augmented channel estimation signal 418). One or more of modules 302 (e.g., extrapolating module 308) may execute an IFFT process 1406, resulting in a time domain representation of the augmented channel estimation signal (e.g., a time-domain representation of augmented channel estimation signal 418), represented in FIG. 14 as h(n).

In some examples, one or more of modules 302 (e.g., extrapolating module 308) may cause the time domain representation of the augmented channel estimation signal (e.g., signal h(n)) to undergo a DMRS measurements process 1408, which may provide parameters $N_0$, $N_1$, and $N_2$.

In the example illustrated in FIG. 14, parameter $N_0$ may define a span of windowing function w(n) having a raised cosine edge with a smooth transition from a zero value to a value represented by the $N_2$ region on the left of plot 1420 and a smooth transition from a value represented by the $N_1$ region on the right of plot 1420. Parameter $N_2$ may define a span of a main lobe of windowing function w(n) and parameter $N_1$ may define a span of a flat top or plateau region of the windowing function w(n). As further shown in FIG. 14, at windowing process 1410, signal h(n) may be windowed by windowing function w(n) in accordance with h(n)w(n), which may result in noise-reduced windowed signal h(n).

At 0-insertion process 1412, a zero-insertion or zero-padding process inserts zeros between the original samples of the discrete h(n) signal. This zero-insertion process is used to interpolate the noise-reduced DMRS channel to all REs in the frequency-time grid. As will be explained in greater detail below in reference to FIGS. 15-18, channel estimation signal 1402 may have a frequency density of ¼ or ⅙ relative to a frequency density of a desired output signal $H_{DMRS}$. The zero-insertion process may bring a frequency density of signal h(n) to the desired frequency density (e.g., a frequency density of 1). As shown in FIG. 14, the zero-insertion process may vary depending on a DMRS configuration type, with 4× or 6× zero-insertion for DMRS configuration type 1 or 2, respectively.

At FFT process 1414, the time-domain signal may be converted back to the frequency domain via an additional FFT operation, resulting in frequency-domain signal $H_{DMRS}$.

After conversion back to the frequency domain, one or more of modules 302 may perform one or more additional operations on a frequency-domain signal (e.g., $H_{DMRS}$) to further improve DMRS channel estimation. FIGS. 15 through 24 illustrate example algorithms or methods for further improving DMRS channel estimation in accordance with the DMRS channel extension and extrapolation architecture disclosed herein.

Returning to FIG. 5, at step 540, one or more of the systems described herein may design, based on a measurement of a DMRS value included in the augmented channel estimation signal, a polyphase filter. For example, designing module 310 may, as part of computing device 402, cause computing device 402 to design, based on a DMRS value included in augmented channel estimation signal 418, polyphase filter 422.

Figure 15:
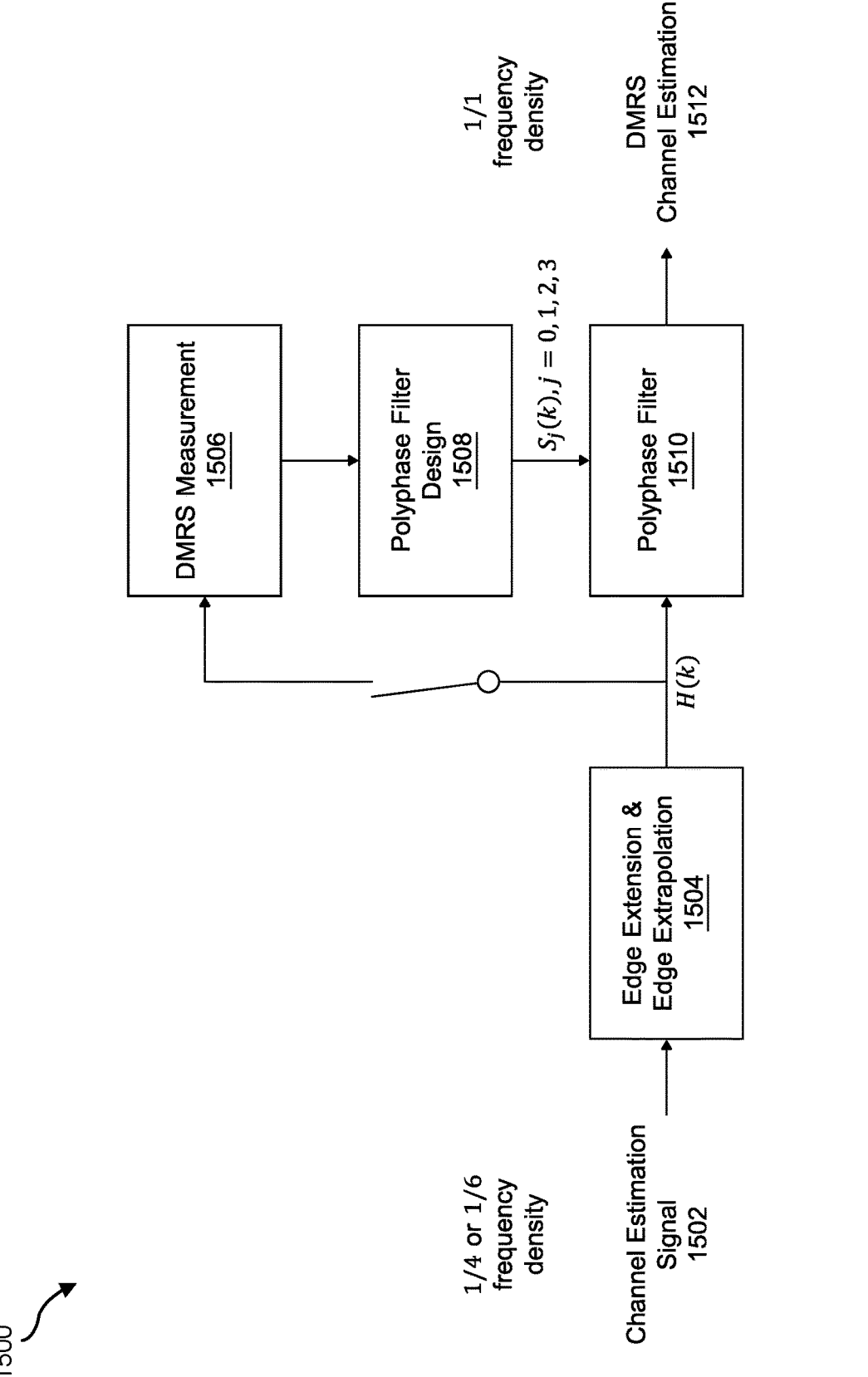
FIGS. 15-19 illustrate systems and methods for designing polyphase filters based on DMRS measurements in accordance with some embodiments described herein.

Designing module 310 may design polyphase filter 422 in a variety of contexts, as may be facilitated by one or more architectures disclosed herein. By way of illustration, FIG. 15 shows a flow diagram 1500 that illustrates a DMRS channel estimation processing chain that may include designing a polyphase filter and filtering an augmented channel estimation signal as described herein. As shown in flow diagram 1500, one or more of modules 302 may cause a channel estimation signal 1502 (such as channel estimation signal 408) to undergo a channel extension and extrapolation process 1504. In some examples, the channel extension and extrapolation process 1504 may include or represent any of the operations described above in relation to modules 302, which may result in an augmented channel estimation signal (e.g., augmented channel estimation signal 418). As further indicated in FIG. 15, one or more of modules 302 may cause at least a portion of the augmented channel estimation signal (denoted as H(k) in FIG. 15) to undergo a DMRS measurements process 1506, which may provide DMRS parameters $N_0$, $N_1$, and $N_2$.

One or more of modules 302 may then design, based on at least one of the DMRS values or parameters included in and/or derived from the augmented channel estimation signal H(k), a polyphase filter 1510. In some examples, one or more of modules 302 may design a plurality of polyphase filters $S_j(k)$, where each polyphase filter may correspond to a different slot included in the channel estimation signal.

A remaining portion of augmented channel estimation signal H(k) may then be filtered using polyphase filter 1510, which may then result in a DMRS channel estimation 1512. In some examples, as shown in FIG. 15, DMRS measurements may be taken, and polyphase filters designed based on, any suitable portion of signal H(k), such as a portion corresponding to one or more particular slots represented in or by signal H(k). This may be illustrated in FIG. 15 by switch 1514, which may be selectively switched "on" for one or more slots and "off" for one or more other slots. Slots or other portions of signal H(k) that are omitted from design of polyphase filter 1510 may still be filtered by polyphase filter 1510, thus achieving some of the benefits described herein.

In some examples, designing module 310 may design polyphase filter 422 differently based on a DMRS configuration type that may correspond to channel estimation signal 408. For example, FIG. 16 includes a flow diagram 1600 that illustrates a process for designing a polyphase filter (e.g., polyphase filter 422) for A DMRS configuration type of 1. As shown, a channel estimation signal 1602 (e.g., a channel estimation signal that has been extended and/or extrapolated in accordance with the systems and methods described herein, such as augmented channel estimation signal 418) may be converted from a frequency-domain signal to a time-domain signal via an IFFT process 1604 (also referred to herein as Nifft). The time-domain signal may then undergo a DMRS measurements process 1606, which may be similar to DMRS measurements process 1408 from FIG. 14. DMRS measurement process 1606 may result in parameters $N_{\{0\}}$, $N_{\{1\}}$, and $N_{\{2\}}$. The resulting time-domain signal may then undergo a further noise reduction in the time domain as part of the filter design process (e.g., NR time-domain filter design 1608). The resulting signal may then be converted back to the frequency domain via another FFT process e.g., FFT 1610, also referred to herein as Nifft2). The frequency-domain filter signal may then undergo a windowing process 1612 and may then be split into a plurality of polyphase filters at operation 1614, resulting in polyphase filters 1616 (also referenced herein as $S_j(k)$).

Figure 17:
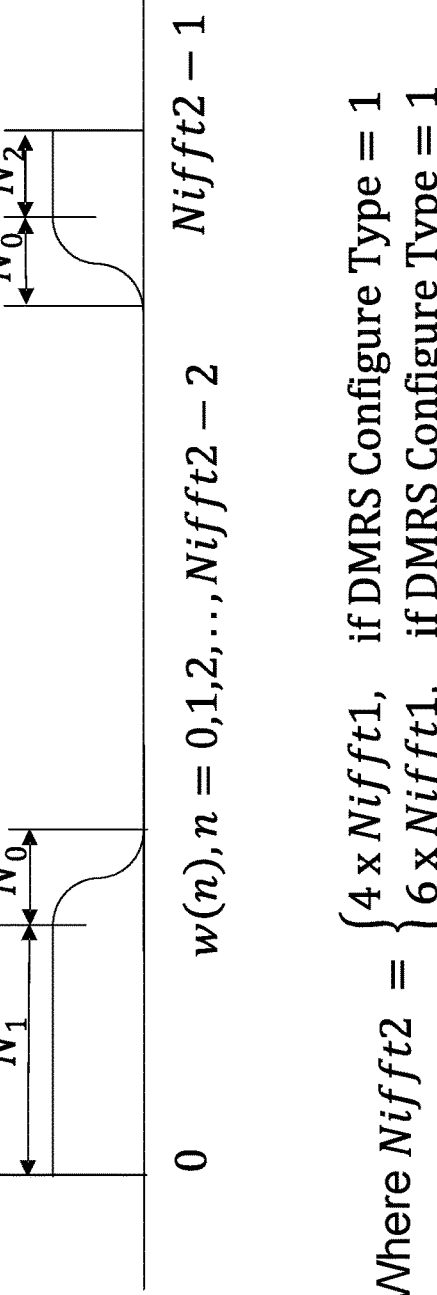

FIG. 17 includes a diagram 1700 that may illustrate an example polyphase filter defined based on parameters $N_0$, $N_1$, and $N_2$. In this example, window w(n) may be applied to samples n=0,1,2, . . . Nifft2-2, where:

$$Nifft2 = \begin{cases} 4 \times Nifft1, & \text{if } DMRS \text{ Configuration Type} = 1 \\ 6 \times Nifft1, & \text{if } DMRS \text{ Configuration Type} = 2 \end{cases}.$$

Figure 18:
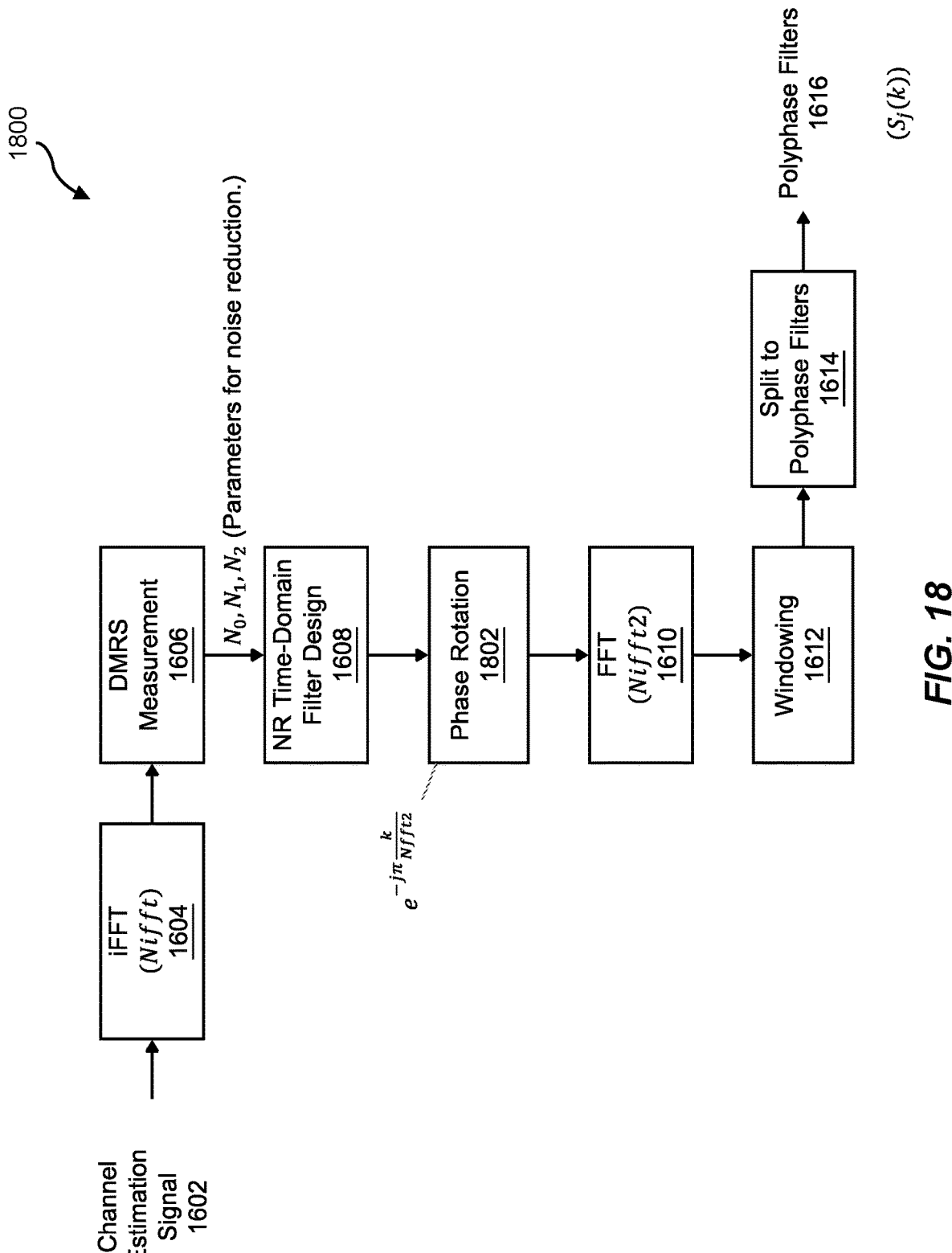
Figure 19:
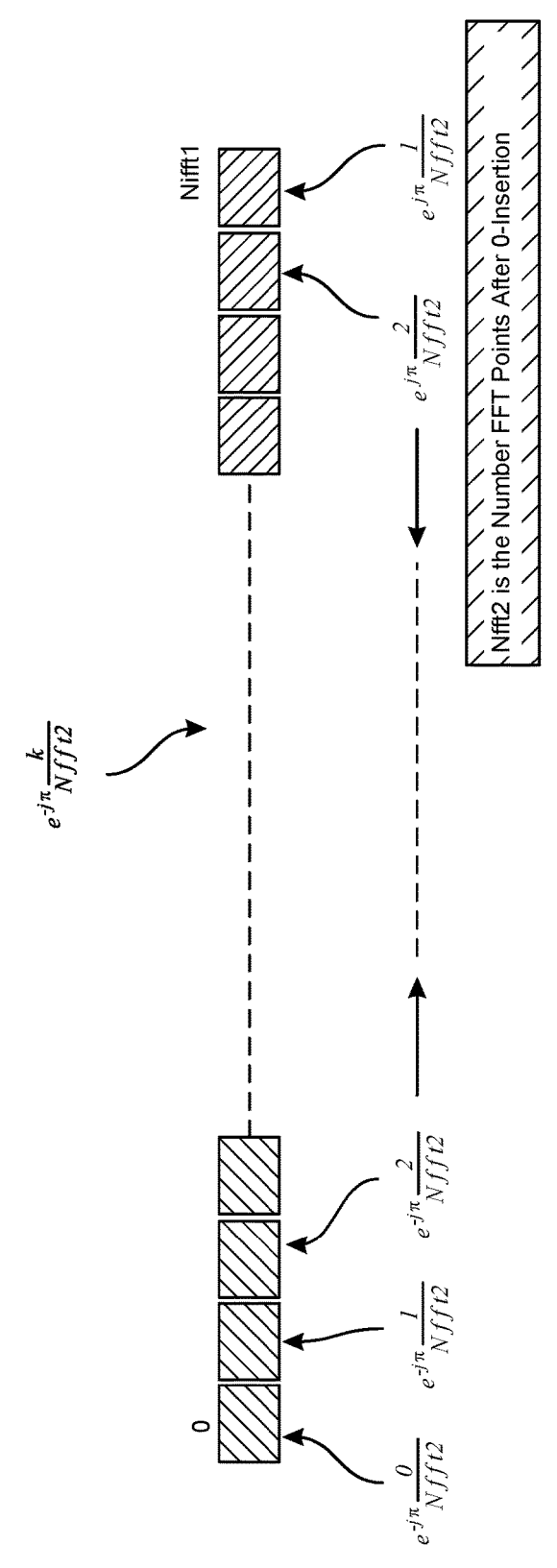

As mentioned above, designing module 310 may design polyphase filter polyphase filter 422 differently based on a DMRS configuration type that may correspond to a channel estimation signal (e.g., channel estimation signal 408). FIG. 18 includes a flow diagram 1800 that illustrates a process for designing a polyphase filter (e.g., polyphase filter 422) for a DMRS configuration type of 2. As shown, FIG. 18 includes the operations from FIG. 16, with the addition of a phase rotation operation 1802 between NR time-domain filter design 1608 and FFT 1610. FIG. 19 includes a diagram 1900 that may illustrate that a phase rotation may be implemented for Nifft1 in accordance with:

$$e^{-j\pi \frac{k}{Nifft2}},$$

where Nift2 may represent a number of FFT points after 0-insertion, as will be explained in greater detail below.

Figure 16:
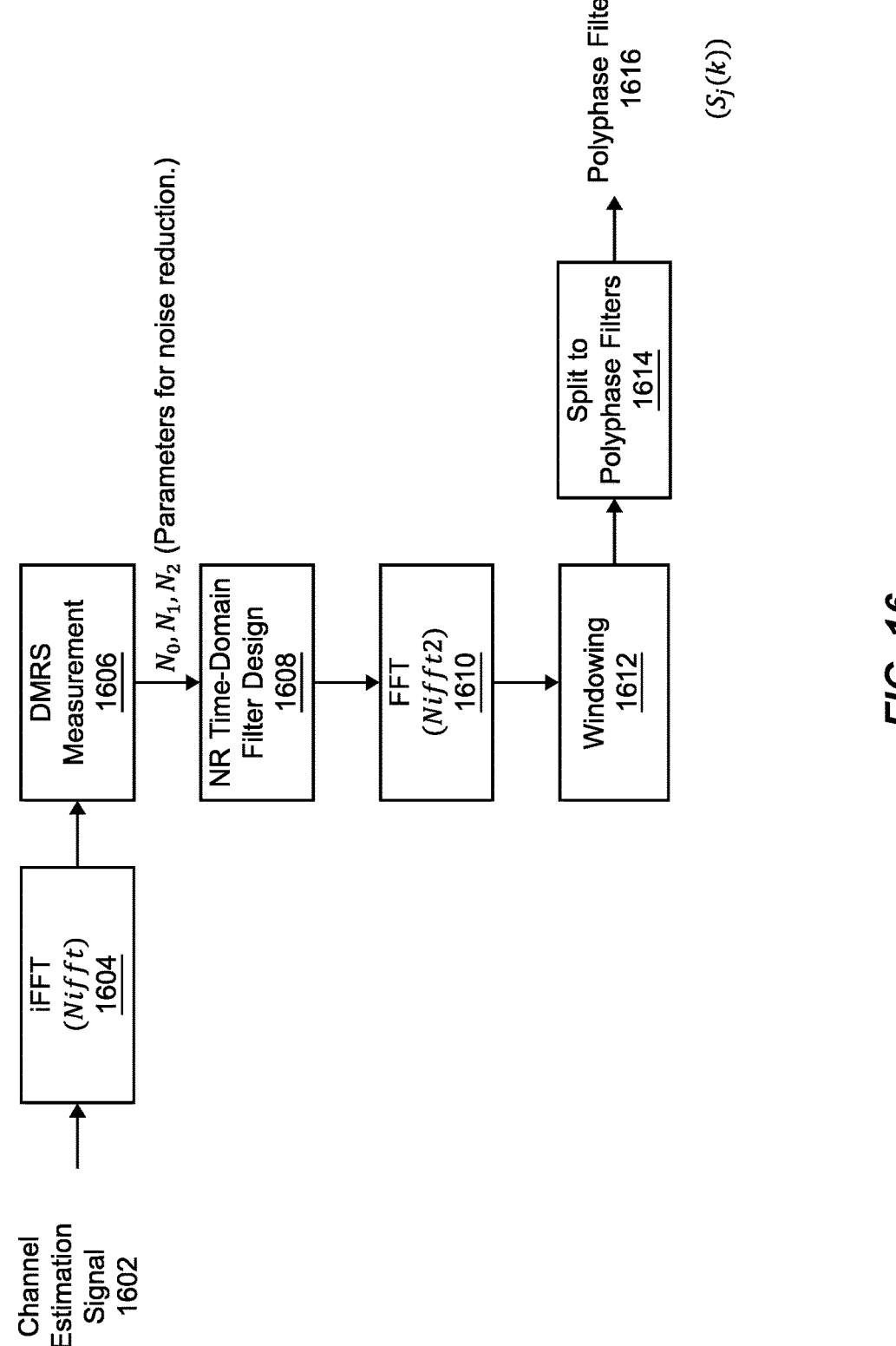

As shown in both FIG. 16 and FIG. 18, a zero-insertion operation and FFT operation may be performed, with the FFT returning the noise-reduction window to the frequency domain (e.g., FFT 1610). The FFT operation may be in a form of:

$$W(k), k = -\frac{Nifft2}{2} + 1, -\frac{Nifft2}{2} + 2, \dots, -1, 0, 1, \dots \frac{Nifft2}{2}$$

At windowing process 1612 in both FIG. 16 and FIG. 18, a result of the output from FFT 1610 may be windowed to truncate the tail of the noise-reduction filter in the frequency domain. The window W'(k) may be represented as:

$$S(k)=W(k)W'(k)$$

Where W'(k) is a rectangular window, Hamming window, or other suitable window or windows, $$k = \begin{cases} -4L \sim +4L, & \text{if } DMRS \text{ Configuration Type} = 1 \\ -6L \sim +6L, & \text{if } DMRS \text{ Configuration Type} = 2 \end{cases}$$

and where L is a parameter having a value of $5 \leq L \leq 10$.

Next, as shown in both FIG. 16 and FIG. 18, at operation 1614, one or more of the systems described herein (e.g., designing module 310) may split or pick out the polyphase filters from H(k) in accordance with:

$$S_j(k) = \begin{cases} s(j + 4k), k = -L, \dots, 0, \dots L, j = 0, 1, 2, 3 \\ \quad \text{if } DMRS \text{ Configuration Type} = 1 \\ s(j + 6k), k = -L, \dots, 0, \dots L, j = 0, 1, 2, 3, 4, 5 \\ \quad \text{if } DMRS \text{ Configuration Type} = 2 \end{cases}$$

Returning to FIG. 5, at step 550, one or more of the systems described herein may estimate a DMRS channel by filtering the augmented channel estimation signal using the designed polyphase filter. For example, estimating module 312 may, as part of computing device 402, cause computing device 402 to estimate DMRS channel 424 by filtering augmented channel estimation signal 418 using polyphase filter 422.

FIG. 20 through FIG. 24 may disclose, describe, and/or illustrate systems and methods for polyphase filtering that may be incorporated into and/or included as part of the frequency domain DMRS channel estimation architecture described above. Throughout these figures, H(k) may represent the LS channel estimate with edges extended and edges extrapolated as described above (e.g., augmented channel estimation signal 418).

Figure 20:
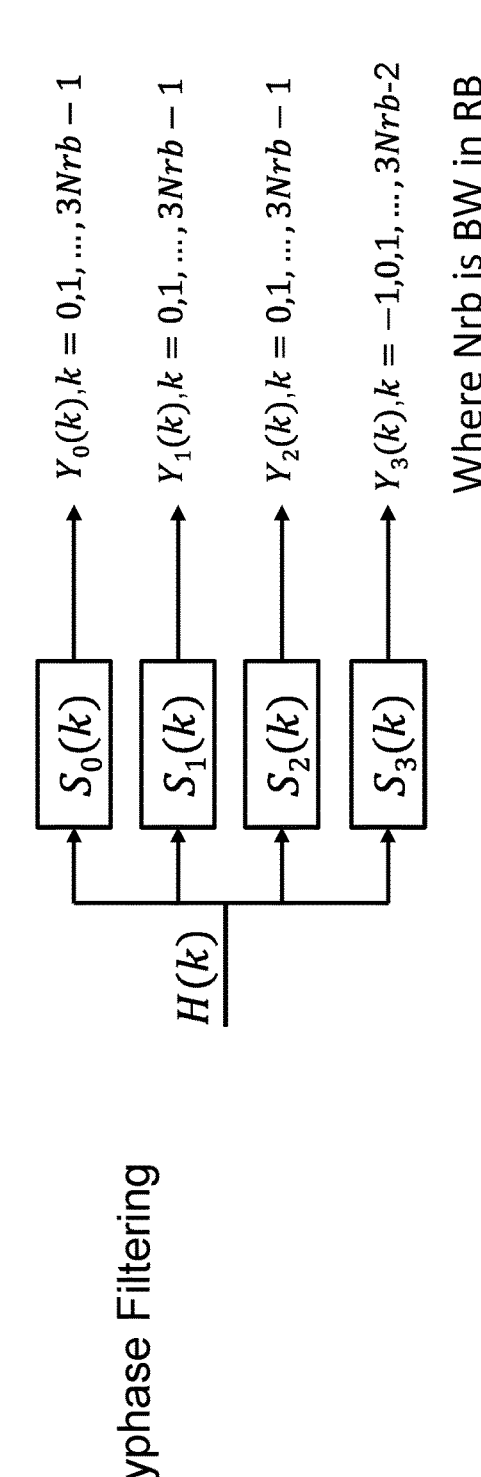
Figure 20:
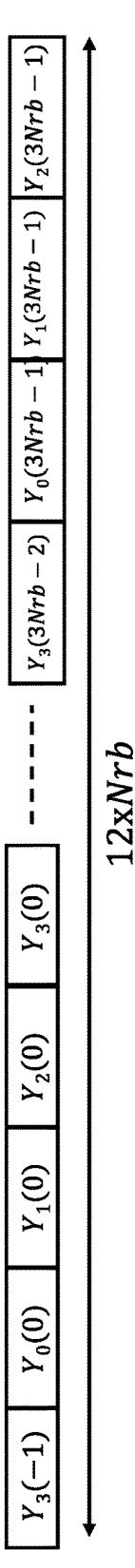
Figure 21:
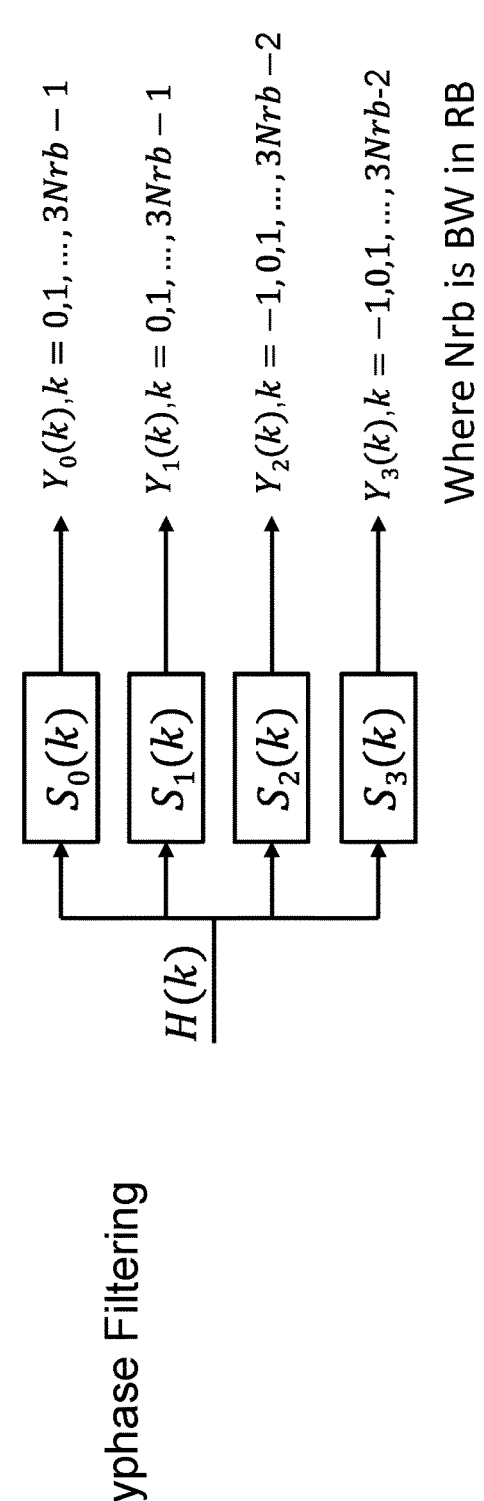
Figure 21:
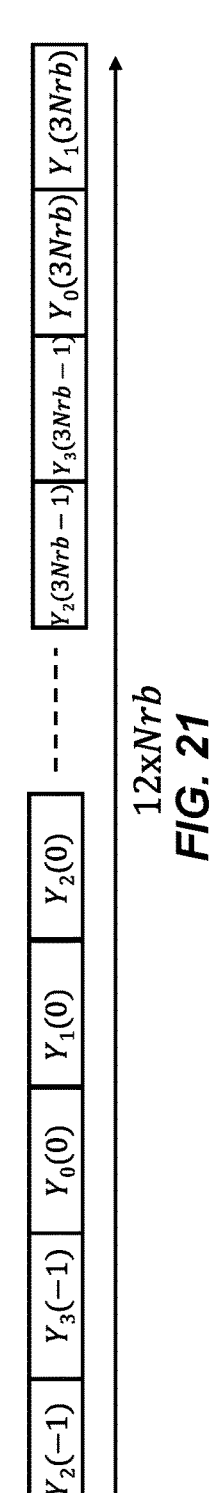

Embodiments of the systems and methods described herein may apply polyphase filtering and may assemble the polyphase results into DMRS channel estimates. FIG. 20 includes a diagram 2000 that may disclose, describe, and/or illustrate polyphase filtering for ports of CDM group 1 of a DMRS configuration type of 1. FIG. 21 includes a diagram 2100 that may disclose, describe, and/or illustrate polyphase filtering for ports of CDM group 2 of a DMRS configuration type of 1. FIG. 22 includes a diagram 2200 that may disclose, describe, and/or illustrate polyphase filtering for ports of CDM group 1 of DMRS configuration type 2. FIG. 23 includes a diagram 2300 that may disclose, describe, and/or illustrate polyphase filtering for ports of CDM group 2 of DMRS configuration type 2. Finally, FIG. 24 includes a diagram 2400 that may disclose, describe, and/or illustrate polyphase filtering for ports of CDM group 3 of DMRS configuration type 2.

The systems and methods described herein may have many benefits over conventional options for DMRS channel estimation. For example, by extending one or more edges of a received frequency-domain signal as described above, embodiments of the systems and methods described herein may reduce impacts at edges, and therefore improve DMRS channel estimation for all packet sizes. The systems and methods described herein may have particular benefit for small- and medium-sized packets. Furthermore, the systems and methods described herein may efficiently achieve DMRS channel estimation via a polyphase filter, avoiding one or more resource intensive time/frequency domain conversions.

The following example embodiments are also included in this disclosure:

Example 1: A computer-implemented method comprising (1) receiving, as part of a demodulation reference signal (DMRS) channel estimation operation, a frequency domain channel estimation signal comprising a plurality of DMRS samples, (2) generating an extended channel estimation signal by determining at least one extended DMRS sample that extends at least one edge of the channel estimation signal, (3) generating an augmented channel estimation signal by extrapolating, based on the extended channel estimation signal, a frequency edge for the augmented channel estimation signal, (4) designing, based on a measurement of a DMRS value included in the augmented channel estimation signal, a polyphase filter, and (5) estimating a DMRS channel by filtering the augmented channel estimation signal using the designed polyphase filter.

Example 2: The computer-implemented method of example 1, wherein (1) the channel estimation signal corresponds to a plurality of slots, (2) designing the polyphase filter based on the measurement of the DMRS value included in the augmented channel estimation signal comprises, for a slot included in the plurality of slots, (A) measuring a slot DMRS value corresponding to the slot, and (B) designing the polyphase filter based on the measured slot DMRS value.

Example 3: The computer-implemented method of example 2, further comprising converting, via an inverse Fast-Fourier Transform (IFFT), the augmented channel estimation signal corresponding to the slot from a frequency domain signal to a time domain signal prior to measuring the slot DMRS value corresponding to the slot.

Example 4: The computer-implemented method of example 3, wherein (1) the slot DMRS value comprises a first parameter, a second parameter, and a third parameter, (2) designing the polyphase filter comprises designing a time-domain polyphase filter having a window in the time domain comprising (A) a first value in a first range, the first range corresponding to the second parameter, (B) the first value in a second range, the second range corresponding to the third parameter, (C) a first transition from the first value to a second value in a third range, the third range corresponding to the first parameter, and (D) a second transition from the second value to the first value in a fourth range, the fourth range corresponding to the first parameter.

Example 5: The computer-implemented method of example 4, wherein designing the polyphase filter further comprises generating a noise-reduced time-domain polyphase filter by applying a noise reduction filter to the time-domain polyphase filter.

Example 6: The computer-implemented method of example 5, wherein (1) the channel estimation operation corresponds to a second DMRS configuration type, and (2) designing the polyphase filter further comprises applying a phase rotation to the noise-reduced time-domain polyphase filter.

Example 7: The computer-implemented method of any of examples 5-6, wherein designing the polyphase filter further comprises generating a noise-reduced frequency-domain polyphase filter by applying (1) a fast Fourier transform to the noise-reduced time-domain polyphase filter, and (2) a windowing function to an output of the fast Fourier transform.

Example 8: The computer-implemented method of example 7, wherein designing the polyphase filter further comprises (1) determining an offset that corresponds to a port associated with the channel estimation signal, (2) adjusting the noise-reduced frequency-domain polyphase filter based on the offset, and (3) designating the adjusted noise-reduced frequency-domain polyphase filter as the designed polyphase filter.

Example 9: The computer-implemented method of any of examples 1-8, wherein estimating the DMRS channel by filtering the augmented channel estimation signal using the designed polyphase filter comprises generating a plurality of filtered channel estimation signals by filtering the augmented channel estimation signal using the designed polyphase filter.

Example 10: The computer-implemented method of example 9, wherein estimating the DMRS channel by filtering the augmented channel estimation signal using the designed polyphase filter further comprises assembling an estimated DMRS channel from the plurality of filtered channel estimation signals.

Example 11: A system comprising (1) a receiving module, stored in memory, that receives, as part of a demodulation reference signal (DMRS) channel estimation operation, a frequency domain channel estimation signal comprising a plurality of DMRS samples, (2) an extending module, stored in memory, that generates an extended channel estimation signal by determining at least one extended DMRS sample that extends at least one edge of the channel estimation signal, (3) an extrapolating module, stored in memory, that generates an augmented channel estimation signal by extrapolating, based on the extended channel estimation signal, a frequency edge for the augmented channel estimation signal, (4) a designing module, stored in memory, that designs, based on a measurement of a DMRS value included in the augmented channel estimation signal, a polyphase filter, (5) an estimating module, stored in memory, that estimates a DMRS channel by filtering the augmented channel estimation signal using the designed polyphase filter, and (6) at least one physical processor that executes the receiving module, the extending module, the extrapolating module, the designing module, and the estimating module.

Example 12: The system of example 11, wherein (1) the channel estimation signal corresponds to a plurality of slots, (2) the designing module designs the polyphase filter based on the measurement of the DMRS value included in the augmented channel estimation signal by, for a slot included in the plurality of slots (A) measuring a slot DMRS value corresponding to the slot, and (B) designing the polyphase filter based on the measured slot DMRS value.

Example 13: The system of example 12, wherein the designing module further converts, via an inverse Fast-Fourier Transform (IFFT), the augmented channel estimation signal corresponding to the slot from a frequency domain signal to a time domain signal prior to measuring the slot DMRS value corresponding to the slot.

Example 14: The system of example 13, wherein (1) the slot DMRS value comprises a first parameter, a second parameter, and a third parameter, (2) the designing module designs the polyphase filter by designing a time-domain polyphase filter having a window in the time domain comprising (A) a first value in a first range, the first range corresponding to the second parameter, (B) the first value in a second range, the second range corresponding to the third parameter, (C) a first transition from the first value to a second value in a third range, the third range corresponding to the first parameter, and (D) a second transition from the second value to the first value in a fourth range, the fourth range corresponding to the first parameter.

Example 15: The system of example 14, wherein the designing module designs the polyphase filter by further generating a noise-reduced time-domain polyphase filter by applying a noise reduction filter to the time-domain polyphase filter.

Example 16: The system of example 15, wherein (1) the channel estimation operation corresponds to a second DMRS configuration type, and (2) the designing module further designs the polyphase filter by further applying a phase rotation to the noise-reduced time-domain polyphase filter.

Example 17: The system of any of examples 15-16, wherein designing the polyphase filter further comprises (1) generating a noise-reduced frequency-domain polyphase filter by applying (A) a fast Fourier transform to the noise-reduced time-domain polyphase filter, and (B) a windowing function to an output of the fast Fourier transform, (2) determining an offset that corresponds to a port associated with the channel estimation signal, (3) adjusting the noise-reduced frequency-domain polyphase filter based on the offset, and (4) designating the adjusted noise-reduced frequency-domain polyphase filter as the designed polyphase filter.

Example 18: The system of any of examples 11-17, wherein the estimating module estimates the DMRS channel by filtering the augmented channel estimation signal using the designed polyphase filter by (1) generating a plurality of filtered channel estimation signals by filtering the augmented channel estimation signal using the designed polyphase filter, and (2) assembling an estimated DMRS channel from the plurality of filtered channel estimation signals.

Example 19: A system comprising (1) a fifth-generation new radio base station that receives an uplink signal from a user equipment device, the uplink signal comprising a frequency domain channel estimation signal comprising a plurality of demodulation reference signal (DMRS) samples, (2) a DMRS channel estimation device comprising (A) a receiving module that receives, as part of a demodulation reference signal (DMRS) channel estimation operation, a frequency domain channel estimation signal comprising a plurality of DMRS samples, (B) an extending module that generates an extended channel estimation signal by determining at least one extended DMRS sample that extends at least one edge of the channel estimation signal, (C) an extrapolating module that generates an augmented channel estimation signal by extrapolating, based on the extended channel estimation signal, a frequency edge for the augmented channel estimation signal, (D) a designing module that designs, based on a measurement of a DMRS value included in the augmented channel estimation signal, a polyphase filter, and (E) an estimating module that estimates a DMRS channel by filtering the augmented channel estimation signal using the designed polyphase filter.

Example 20: The system of example 19, wherein (1) the channel estimation signal corresponds to a plurality of slots, (2) the designing module designs the polyphase filter based on the measurement of the DMRS value included in the augmented channel estimation signal by, for a slot included in the plurality of slots, (A) measuring a slot DMRS value corresponding to the slot, and (B) designing the polyphase filter based on the measured slot DMRS value.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a frequency domain signal to be transformed, transform the frequency domain signal, output a result of the transformation to perform a channel estimation function, use the result of the transformation to estimate an uplink channel, and store the result of the transformation to maintain or reestablish a connection with a user equipment device via the uplink channel. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving, as part of a demodulation reference signal (DMRS) channel estimation operation, a frequency domain channel estimation signal comprising a plurality of DMRS samples;
generating an extended channel estimation signal by determining at least one extended DMRS sample that extends at least one edge of the frequency domain channel estimation signal;
generating an augmented channel estimation signal by extrapolating, based on the extended channel estimation signal, a frequency edge for the augmented channel estimation signal;
designing, based on a measurement of a DMRS value included in the augmented channel estimation signal, a polyphase filter; and
estimating a DMRS channel by filtering the augmented channel estimation signal using the designed polyphase filter.

2. The computer-implemented method of claim 1, wherein:
the channel estimation signal corresponds to a plurality of slots;
designing the polyphase filter based on the measurement of the DMRS value included in the augmented channel estimation signal comprises, for a slot included in the plurality of slots:
measuring a slot DMRS value corresponding to the slot; and
designing the polyphase filter based on the measured slot DMRS value.

3. The computer-implemented method of claim 2, further comprising converting, via an inverse Fast-Fourier Transform (IFFT), the augmented channel estimation signal corresponding to the slot from a frequency domain signal to a time domain signal prior to measuring the slot DMRS value corresponding to the slot.

4. The computer-implemented method of claim 3, wherein:
the slot DMRS value comprises a first parameter, a second parameter, and a third parameter;
designing the polyphase filter comprises designing a time-domain polyphase filter having a window in the time domain comprising:
a first value in a first range, the first range corresponding to the second parameter;
the first value in a second range, the second range corresponding to the third parameter;
a first transition from the first value to a second value in a third range, the third range corresponding to the first parameter; and
a second transition from the second value to the first value in a fourth range, the fourth range corresponding to the first parameter.

5. The computer-implemented method of claim 4, wherein designing the polyphase filter further comprises generating a noise-reduced time-domain polyphase filter by applying a noise reduction filter to the time-domain polyphase filter.

6. The computer-implemented method of claim 5, wherein:
the channel estimation operation corresponds to a second DMRS configuration type; and
designing the polyphase filter further comprises applying a phase rotation to the noise-reduced time-domain polyphase filter.

7. The computer-implemented method of claim 5, wherein designing the polyphase filter further comprises generating a noise-reduced frequency-domain polyphase filter by applying:
a fast Fourier transform to the noise-reduced time-domain polyphase filter; and
a windowing function to an output of the fast Fourier transform.

8. The computer-implemented method of claim 7, wherein designing the polyphase filter further comprises:
determining an offset that corresponds to a port associated with the channel estimation signal;
adjusting the noise-reduced frequency-domain polyphase filter based on the offset; and
designating the adjusted noise-reduced frequency-domain polyphase filter as the designed polyphase filter.

9. The computer-implemented method of claim 1, wherein estimating the DMRS channel by filtering the augmented channel estimation signal using the designed polyphase filter comprises generating a plurality of filtered channel estimation signals by filtering the augmented channel estimation signal using the designed polyphase filter.

10. The computer-implemented method of claim 9, wherein estimating the DMRS channel by filtering the augmented channel estimation signal using the designed polyphase filter further comprises assembling an estimated DMRS channel from the plurality of filtered channel estimation signals.

11. A system comprising:
a receiving module, stored in memory, that receives, as part of a demodulation reference signal (DMRS) channel estimation operation, a frequency domain channel estimation signal comprising a plurality of DMRS samples;

an extending module, stored in memory, that generates an extended channel estimation signal by determining at least one extended DMRS sample that extends at least one edge of the frequency domain channel estimation signal;

an extrapolating module, stored in memory, that generates an augmented channel estimation signal by extrapolating, based on the extended channel estimation signal, a frequency edge for the augmented channel estimation signal;

a designing module, stored in memory, that designs, based on a measurement of a DMRS value included in the augmented channel estimation signal, a polyphase filter;

an estimating module, stored in memory, that estimates a DMRS channel by filtering the augmented channel estimation signal using the designed polyphase filter; and at least one physical processor that executes the receiving module, the extending module, the extrapolating module, the designing module, and the estimating module.

12. The system of claim 11, wherein:

the channel estimation signal corresponds to a plurality of slots;

the designing module designs the polyphase filter based on the measurement of the DMRS value included in the augmented channel estimation signal by, for a slot included in the plurality of slots:

measuring a slot DMRS value corresponding to the slot; and designing the polyphase filter based on the measured slot DMRS value.

13. The system of claim 12, wherein the designing module further converts, via an inverse Fast-Fourier Transform (IFFT), the augmented channel estimation signal corresponding to the slot from a frequency domain signal to a time domain signal prior to measuring the slot DMRS value corresponding to the slot.

14. The system of claim 13, wherein:

the slot DMRS value comprises a first parameter, a second parameter, and a third parameter;

the designing module designs the polyphase filter by designing a time-domain polyphase filter having a window in the time domain comprising:

a first value in a first range, the first range corresponding to the second parameter;

the first value in a second range, the second range corresponding to the third parameter;

a first transition from the first value to a second value in a third range, the third range corresponding to the first parameter; and a second transition from the second value to the first value in a fourth range, the fourth range corresponding to the first parameter.

15. The system of claim 14, wherein the designing module designs the polyphase filter by further generating a noise-reduced time-domain polyphase filter by applying a noise reduction filter to the time-domain polyphase filter.

16. The system of claim 15, wherein:

the channel estimation operation corresponds to a second DMRS configuration type; and the designing module further designs the polyphase filter by further applying a phase rotation to the noise-reduced time-domain polyphase filter.

17. The system of claim 15, wherein designing the polyphase filter further comprises:

generating a noise-reduced frequency-domain polyphase filter by applying:

a fast Fourier transform to the noise-reduced time-domain polyphase filter; and a windowing function to an output of the fast Fourier transform;

determining an offset that corresponds to a port associated with the channel estimation signal;

adjusting the noise-reduced frequency-domain polyphase filter based on the offset; and designating the adjusted noise-reduced frequency-domain polyphase filter as the designed polyphase filter.

18. The system of claim 11, wherein the estimating module estimates the DMRS channel by filtering the augmented channel estimation signal using the designed polyphase filter by:

generating a plurality of filtered channel estimation signals by filtering the augmented channel estimation signal using the designed polyphase filter; and assembling an estimated DMRS channel from the plurality of filtered channel estimation signals.

19. A system comprising:

a fifth-generation new radio base station that receives an uplink signal from a user equipment device, the uplink signal comprising a frequency domain channel estimation signal comprising a plurality of demodulation reference signal (DMRS) samples;

a DMRS channel estimation device comprising:

a receiving module that receives, as part of a demodulation reference signal (DMRS) channel estimation operation, a frequency domain channel estimation signal comprising a plurality of DMRS samples;

an extending module that generates an extended channel estimation signal by determining at least one extended DMRS sample that extends at least one edge of the frequency domain channel estimation signal;

an extrapolating module that generates an augmented channel estimation signal by extrapolating, based on the extended channel estimation signal, a frequency edge for the augmented channel estimation signal;

a designing module that designs, based on a measurement of a DMRS value included in the augmented channel estimation signal, a polyphase filter; and an estimating module that estimates a DMRS channel by filtering the augmented channel estimation signal using the designed polyphase filter.

20. The system of claim 19, wherein:

the channel estimation signal corresponds to a plurality of slots;

the designing module designs the polyphase filter based on the measurement of the DMRS value included in the augmented channel estimation signal by, for a slot included in the plurality of slots:

measuring a slot DMRS value corresponding to the slot; and designing the polyphase filter based on the measured slot DMRS value.

* * * * *